United States Patent
Mlcak et al.

(10) Patent No.: US 9,031,705 B2
(45) Date of Patent: *May 12, 2015

(54) ADJUSTABLE SYSTEMS AND METHODS FOR INCREASING THE EFFICIENCY OF A KALINA CYCLE

(75) Inventors: Henry A Mlcak, Seely, TX (US); Mark D Mirolli, Key Largo, FL (US); Yakov Lerner, Foster City, CA (US)

(73) Assignee: Recurrent Engineering, LLC, Kennett Square, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/597,132

(22) Filed: Aug. 28, 2012

(65) Prior Publication Data

US 2013/0231789 A1 Sep. 5, 2013

Related U.S. Application Data

(63) Continuation-in-part of application No. 12/922,112, filed as application No. PCT/US2010/041824 on Jul. 13, 2010, now Pat. No. 8,744,636.

(60) Provisional application No. 61/225,567, filed on Jul. 15, 2009.

(51) Int. Cl.
| | |
|---|---|
| *G05D 11/00* | (2006.01) |
| *G06F 1/26* | (2006.01) |
| *F01K 13/02* | (2006.01) |
| *F01K 25/06* | (2006.01) |
| *F22B 1/28* | (2006.01) |

(52) U.S. Cl.
CPC . *G06F 1/26* (2013.01); *F01K 13/02* (2013.01); *F01K 25/06* (2013.01); *F22B 1/28* (2013.01)

(58) Field of Classification Search
USPC .......................... 700/288; 166/145; 219/770
See application file for complete search history.

(56) References Cited

U.S. PATENT DOCUMENTS

| | | | | |
|---|---|---|---|---|
| 6,125,632 | A * | 10/2000 | Hansen et al. | 60/649 |
| 6,195,998 | B1 | 3/2001 | Hansen et al. | |
| 2005/0028520 | A1* | 2/2005 | Chertok | 60/517 |
| 2007/0045266 | A1* | 3/2007 | Sandberg et al. | 219/207 |
| 2007/0108200 | A1* | 5/2007 | McKinzie et al. | 219/770 |
| 2007/0119098 | A1* | 5/2007 | Diaz et al. | 48/127.3 |
| 2007/0133961 | A1* | 6/2007 | Fairbanks et al. | 392/301 |

(Continued)

FOREIGN PATENT DOCUMENTS

JP 2000-161018 A 6/2000

OTHER PUBLICATIONS

International Search Report and Written Opinion dated Feb. 9, 2011 from International Patent Application No. PCT/US2010/041824 filed Jul. 13, 2010 (8 pages).

*Primary Examiner* — Sean Shechtman
*Assistant Examiner* — Anthony Whittington
(74) *Attorney, Agent, or Firm* — Sunstone IP

(57) ABSTRACT

A Kalina Cycle control system monitors one or more operating parameters of the Kalina Cycle. The system calculates one or more optimal operating parameters that allow the Kalina Cycle to operate at an increased efficiency. The system automatically adjusts the one or more actual operating parameters to the optimal parameters to increase the efficiency of the Kalina Cycle. Methods of increasing the efficiency of a Kalina Cycle include automatically adjusting one or more operating parameters to an optimal configuration.

8 Claims, 10 Drawing Sheets

(56) References Cited

U.S. PATENT DOCUMENTS

| | | | |
|---|---|---|---|
| 2007/0137857 A1* | 6/2007 | Vinegar et al. | 166/245 |
| 2007/0144732 A1* | 6/2007 | Kim et al. | 166/145 |
| 2007/0234702 A1* | 10/2007 | Hagen et al. | 60/39.01 |
| 2007/0256432 A1* | 11/2007 | Zugibe et al. | 62/115 |
| 2008/0217321 A1* | 9/2008 | Vinegar et al. | 219/492 |
| 2009/0025399 A1* | 1/2009 | Kamen et al. | 62/6 |
| 2011/0077783 A1* | 3/2011 | Karpman et al. | 700/283 |
| 2011/0230981 A1* | 9/2011 | Karpman et al. | 700/30 |

* cited by examiner

ADJUSTABLE SYSTEMS AND METHODS FOR INCREASING THE EFFICIENCY OF A KALINA CYCLE

CROSS-REFERENCE TO RELATED APPLICATIONS

The present application is a continuation-in-part of U.S. patent application Ser. No. 12/922,112, filed Sep. 10, 2009, entitled "SYSTEMS AND METHODS FOR INCREASING THE EFFICIENCY OF A KALINA CYCLE," which is a national stage application of International Application No. PCT/US10/41824, filed Jul. 13, 2010, entitled "SYSTEMS AND METHODS FOR INCREASING THE EFFICIENCY OF A KALINA CYCLE," and which claims the benefit of priority to U.S. Provisional Application No. 61/225,567, filed Jul. 15, 2009, entitled "SYSTEM AND METHOD OF OPTIMIZING EFFICIENCY OF A KALINA CYCLE." The entire contents of above-referenced applications are incorporated by reference herein.

BACKGROUND OF THE INVENTION

1. The Field of the Invention

The present invention relates to systems, methods, and apparatus adapted to increase the efficiency of a thermodynamic cycle. In particular, the present invention relates to monitoring and adjusting various parameters of a Kalina Cycle to increase the overall efficiency of the cycle.

2. Background and Relevant Art

Some conventional energy conversion systems allow heat that would otherwise be wasted to be turned into useful energy. One example of an energy conversion system is one that converts thermal energy from a geothermal hot water or industrial waste heat source into electricity. Such thermodynamic system can include Kalina Cycles. A Kalina Cycle is a "closed-loop" thermodynamic cycle used in converting thermal energy to mechanical power by way of a turbine. As with similar "closed-loop" thermodynamic cycles, the Kalina Cycle's efficiency is at least partially dependent on temperatures of the heat source and the cooling source.

Turbines typically cannot directly use the "heat source" and "cooling source;" therefore, a medium, referred to as a "working fluid," is used to go between the heat source and the cooling source. For example, the heat from relatively hot liquids in a geothermal vent (e.g., "brine") can be used to heat the working fluid, using one or more heat exchangers. The fluid is heated from a low energy and low temperature fluid state into a relatively high-temperature vapor. The high-temperature vapor working fluid can then be passed through one or more turbines, causing the one or more turbines to spin and generate electricity.

In the process of driving the turbine, the vapor expands and exits the turbine at a lower pressure and temperature. After exiting the turbine, the fluid is condensed to a liquid in a condenser using a "cooling source." A higher cycle efficiency (and thus more power output) can be realized when the pressure differential between the turbine inlet and turbine exhaust is optimized. These pressures are dependent on the "heat source" and "cooling source" temperatures.

When the "heat sources" and "cooling sources" cannot be used directly by a turbine, then the next best thing (for maximizing efficiency) is to have a working fluid that can exchange energy between heat and cooling sources as efficiently as possible. Most non Kalina Cycle "closed-loop" thermodynamic cycles utilize a working fluid that is a single (or pure) component fluid. For example, much of electrical power today is generated by Rankine Cycle based power plants. These plants use pure "water" as the working fluid. Pure working fluids, like water, are typically limited in heat exchange between the heat and cooling sources. This is because pure fluids boil and condense at a constant temperature. This constant temperature can be in direct conflict with the variable temperature nature of most "heat" and "cooling" sources. The constant versus variable temperature difference between the working fluid and heat/cooling sources is a thermodynamic structural difference that can result in efficiency losses in Rankine Cycle power plants.

Kalina Cycle plants differ from Rankine Cycle plants in at least one very distinctive way. The working fluid in Kalina Cycle plants is typically an ammonia-water mixture. Ammonia-water mixtures have many basic features unlike that of either pure water or pure ammonia. A mixture of the two fluids can perform like a totally new fluid. The essence of the Kalina Cycle takes advantage of the ability of an ammonia-water mixture to boil and condense at a variable temperature—similar to the heat and cooling sources, and thus, better exchange energy with these sources. This can result in higher cycle efficiency.

Typically when implementing a Kalina Cycle, the temperatures of the heating and cooling sources are determined. Based on this determination, the optimal concentration of the ammonia-water working fluid is calculated to allow the working fluid to best exchange energy with the heating and cooling sources, and thus, maximize the efficiency of the system.

In addition to the concentration of the ammonia-water working fluid, various other parameters of the Kalina Cycle can influence the overall efficiency of the cycle. Some such parameters include the pressure of the working fluid, and the flow rate of the working fluid in relation to the flow rate of the heating and or cooling source. Typically, each of these parameters is optimized based on an initial determination of the heating and cooling source temperatures and other system parameters. Once these various parameters are initially set, some are rarely adjusted.

One will appreciate, however, that the heating and cooling sources may undergo change both slowly over time and in some cases rapidly. These changes in one or more of the heating and cooling sources can influence the efficiency of the Kalina Cycle. Furthermore, the reduction in efficiency due to these temperature swings is especially pronounced in applications where the difference between the heat source temperature and the cooling source temperature is low, e.g. low temperature geothermal applications.

BRIEF SUMMARY OF THE INVENTION

The present invention solves one or more of the foregoing, or other, problems in the art with systems, apparatus, and methods configured to monitor and automatically adjust operating parameters of a Kalina Cycle to help improve efficiency. For example, according to one or more implementations of the present invention, a Kalina Cycle control system can include one or more sensors that monitor the heating source and the cooling source. The control system can then automatically adjust one or more of the operating parameters of the Kalina Cycle in response to detected changes in one or more of the heating or cooling source. In additional or alternative implementations of the present invention, a Kalina Cycle control system can monitor one or more operating parameters of the Kalina Cycle, and can automatically adjust one or more of the operating parameters to increase the efficiency of the Kalina Cycle.

For example, a control system for maximizing the efficiency of a Kalina Cycle of one or more implementations can include a control system processor. The control system can also include one or more sensors adapted to measure one or more parameters of the Kalina Cycle, and transmit measured data to the control system processor. The control system can further include one or more Kalina Cycle components adapted to be controlled by the control system processor to modify one or more additional parameters of the Kalina Cycle.

Additionally, a method of increasing the efficiency of a Kalina Cycle of one or more implementations can involve collecting data at one or more sensors indicative of one or more parameters of the Kalina Cycle upon which the efficiency of the Kalina Cycle depends. The method can also involve transmitting the data to a control system processor using one or more transmission mechanisms. Furthermore, the method can involve calculating one or more actual parameters based upon the data using a control system processor. Additionally, the method can involve determining one or more optimal parameters that will increase the efficiency of the Kalina Cycle. The method can further involve automatically adjusting the one or more actual parameters to the one or more optimal parameters.

In addition to the foregoing, an apparatus for implementing a thermodynamic cycle of one or more implementations can include an expander adapted to expand a multi-component vapor working stream transforming its energy into a useable form and producing a spent stream. The apparatus can also include a separator adapted to separate the spent stream into a rich stream and a lean stream. Additionally, the apparatus can include a tank adapted to receive at least a portion of the lean stream from the separator and hold an amount of the lean stream therein. The apparatus can further include a valve adapted to influence the volume flow rate of the lean stream exiting the tank. Furthermore, the apparatus can include a mixer adapted to mix the lean stream exiting the tank with the rich stream producing a combined stream. The apparatus can also include a condenser adapted to condense the combined stream producing a multi-component working stream. The apparatus can further include a second heat exchanger adapted to heat the multi-component working stream producing the vapor working stream. In addition, the apparatus can include a sensor adapted to measure a concentration ratio of multi-component working stream. The apparatus can additionally include a control system adapted to automatically manipulate the valve to change the concentration ratio of the multi-component working stream in response to a change in a parameter of the thermodynamic cycle.

Another implementation of a control system for increasing the efficiency of a Kalina Cycle includes a control system processor and one or more sensors adapted to measure one or more parameters of the Kalina Cycle and transmit measured data to the control system processor. The one or more parameters include a concentration of a basic working fluid within the Kalina Cycle. The system also includes a first set of one or more Kalina Cycle components adapted to be controlled by the control system processor to modify the concentration of the basic working fluid without modifying an equilibrium concentration of the working fluid in the Kalina Cycle. Additionally, the system includes a second set of one or more Kalina Cycle components adapted to be controlled by the control system processor to modify the concentration of the basic working fluid in connection with modifying an equilibrium concentration of the working fluid in the Kalina Cycle.

Another implementation of a method of increasing the efficiency of a Kalina Cycle involves collecting data at one or more sensors indicative of one or more parameters of the Kalina Cycle upon which the efficiency of the Kalina Cycle depends. The one or more parameters comprise a concentration of a basic working fluid within the Kalina Cycle. Additionally, the method involves transmitting the data to a control system processor using one or more transmission mechanisms and calculating one or more actual parameters based upon the data using a control system processor. The method also includes determining a concentration of the working fluid that will increase the efficiency of the Kalina Cycle. Moreover, the method involves automatically adjusting an equilibrium concentration of basic working fluid in the Kalina Cycle. Also, the method involves adjusting the concentration of the basic working fluid mixture in the Kalina Cycle.

In addition to the foregoing, another implementation of an apparatus for implementing a thermodynamic cycle includes a Kalina Cycle system, a first external tank holding rich working fluid or lean working fluid, and a control system. The Kalina Cycle system includes an expander adapted to expand a multi-component vapor working stream transforming its energy into a useable form and producing a spent stream. The Kalina Cycle system also includes a separator adapted to separate the spent stream into a rich stream and a lean stream. Additionally, the Kalina Cycle system includes a first tank adapted to receive at least a portion of the lean stream from the separator and hold an amount of the lean stream therein. Still further the Kalina Cycle system includes a mixer adapted to mix the lean stream exiting the first tank with the rich stream producing a combined stream. The Kalina Cycle system also includes a condenser adapted to condense the combined stream producing a multi-component working stream. The Kalina Cycle system additionally includes a second heat exchanger adapted to heat the multi-component working stream producing the multi-component vapor working stream. The first external tank is coupled to the Kalina cycle system and adapted to add rich working fluid or lean working fluid to the Kalina Cycle system. The control system is adapted to automatically add rich working fluid or lean working fluid from the first external tank to the Kalina Cycle system to change an equilibrium concentration of basic working fluid in the Kalina Cycle system.

Additional features and advantages of exemplary embodiments of the invention will be set forth in the description which follows, or may be learned by the practice of such exemplary embodiments. The features and advantages of such embodiments may be realized and obtained by means of the systems and methods particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
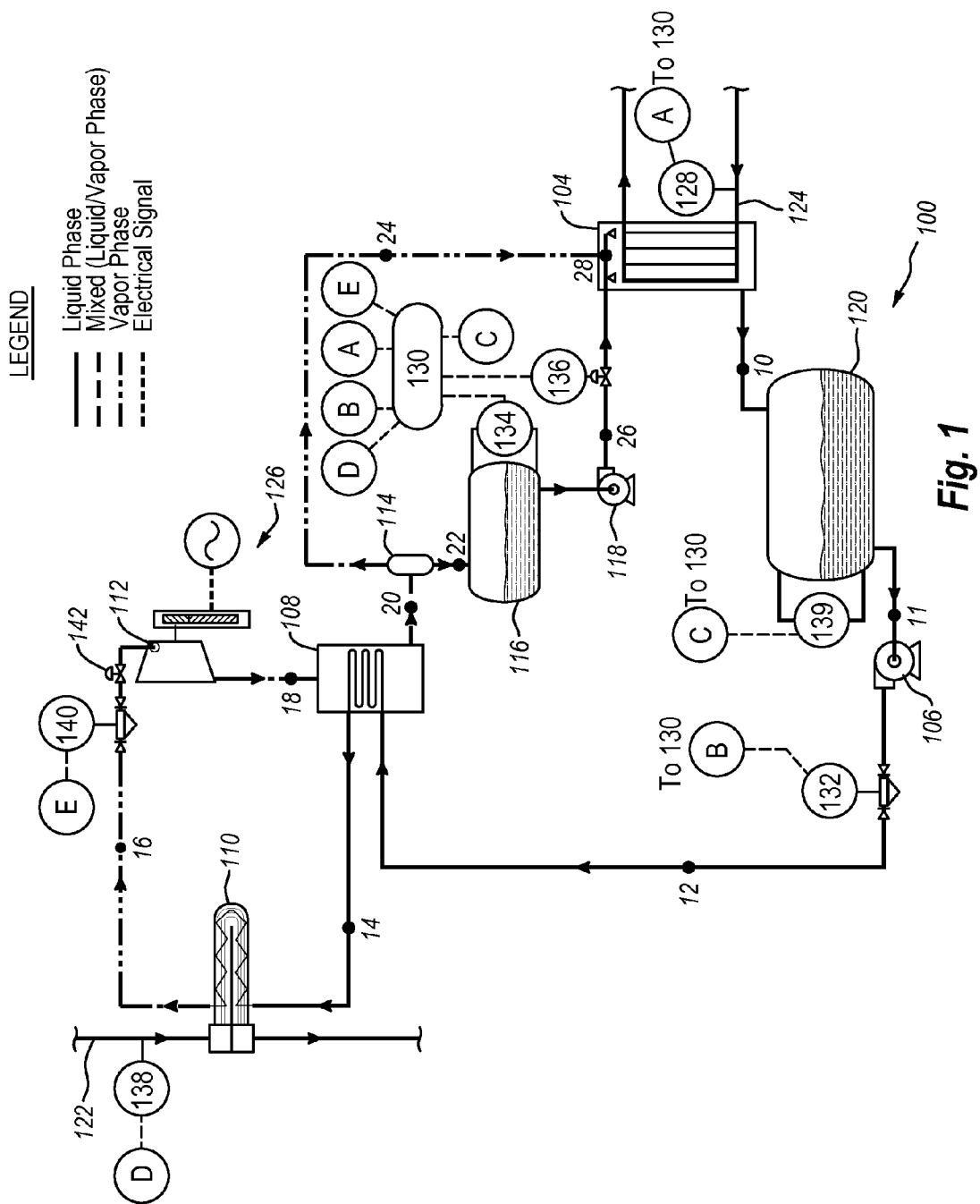
FIG. 1 illustrates a schematic diagram of a Kalina Cycle energy conversion system, including a control system in accordance with an implementation of the present invention.

The present invention extends to systems, apparatus, and methods configured to monitor and automatically adjust operating parameters of a Kalina Cycle to help improve efficiency. For example, according to one or more implementations of the present invention, a Kalina Cycle control system can include one or more sensors that monitor the heating source and the cooling source. The control system can then automatically adjust one or more of the operating parameters of the Kalina Cycle in response to detected changes in one or more of the heating or cooling source. In additional or alternative implementations of the present invention, a Kalina Cycle control system can monitor one or more operating parameters of the Kalina Cycle, and can automatically adjust one or more of the operating parameters to increase the efficiency of the Kalina Cycle.

As an initial matter, the various implementations of the present invention may be implemented with a closed-loop thermodynamic system which utilizes a multi-component working fluid, such as a Kalina Cycle system. While it is understood that the invention may be incorporated into a variety of different types of thermodynamic cycle systems, reference will be made herein specifically to a Kalina Cycle system. The particular Kalina Cycles illustrated and described herein are only examples of a few of the various Kalina Cycles with which the present invention may be implemented. Other exemplary Kalina Cycle technologies with which the present invention may be implemented are illustrated in U.S. Pat. Nos. 7,516,619; 5,822,990; 5,953,918; 5,572,871; 5,440,882 and 4,982,568, the contents of each of which are hereby incorporated by reference in their entirety.

As mentioned previously, one or more implementations of the present invention can include a control system, and related methods, for monitoring the concentration of the basic working fluid in a Kalina Cycle, the temperature of the heat source for the Kalina Cycle, and/or the temperature of the cooling source of the Kalina Cycle. Whenever the heat source temperature and/or cooling source temperature changes, the control system can adjust the concentration of the basic working fluid of the Kalina Cycle accordingly to increase the efficiency of the Kalina Cycle, and thus, increase the power output of the Kalina Cycle.

One will appreciate in light of the disclosure herein that such a control system, and related methods can be particularly useful with Kalina Cycles where one or more of the temperatures of the heat source or cooling source are dynamic. Such Kalina Cycles can include cycles that utilize waste energy from a process plant, such as, for example, a steel mill or foundry as a heat source. The process plant may have batch type operations which result is heat source temperatures that cycle hourly, or even more frequently.

On the cooling source side, many geothermal applications are located in arid regions and utilize "ambient air" in air-cooled condensers. The day-to-night air temperature swing in these areas can be as much as 40° F. Therefore, in a 24-hour period the ambient air temperature can change from a low of, for example, 50° F. at night, to a high of 90° F. during the day, and back down to 50° F. at night. This difference between the low and high cooling temperature swing can be even much greater during "cold front" weather events or heat waves.

Referring now to the Figures, FIG. 1 illustrates a schematic of a Kalina Cycle 100 including a control system 130. The control system 130 can adjust the concentration of the basic working fluid of the Kalina Cycle 100 based on a change in temperature of one or more of a heat source 122 and a cooling source 124. In particular, the control system 130 can adjust the concentration of the basic working fluid to increase, or optimize, the efficiency of the Kalina Cycle 100.

As illustrated by FIG. 1, the Kalina Cycle 100 can include a first heat exchanger or condenser 104, a feed pump 106, a second heat exchanger 108, a third heat exchanger or evaporator 110, and a turbine 112. Additionally, the Kalina Cycle 100 can include a separator 114, a drain tank 116, a drain pump 118, and a tank 120. As explained in greater detail below, the Kalina Cycle 100 can work with an external heating source 122 and an external cooling source 124.

Starting at the outlet of the tank 120, the working fluid (an ammonia-water mixture) has a certain set of parameters at point 11, referred to herein after as the basic mixture or basic working fluid mixture. The working fluid is then pumped to a higher pressure by pump 106 to create a pressurized working fluid at point 12. The pressurized working fluid then passes through the second heat exchanger 108, where it is preheated by the stream exiting the turbine 112 to create a preheated working fluid at point 14. The preheated working fluid then passes through heat exchanger 110, where it is heated by the external heat source 122 to create an at least partially evaporated working stream at point 16. The at least partially evaporated working stream then passes through the turbine 112, and drives the turbine 112 to generate mechanical energy that is converted into electrical energy by a generator 126. Within the turbine 112, the working stream expands, and exits the turbine 112 as a low-pressure working stream or an at least partially spent stream at point 18.

The low-pressure working stream then passes through the secondary side of the second heat exchanger 108 to preheat the pressurized working fluid, as mentioned above. By preheating the pressurized working stream, the low-pressure working stream is cooled to create a partially condensed working stream or cooled spent stream at point 20. The partially condensed working stream then enters separator 114. The separator 114 divides the partially condensed working stream into a lean (low in ammonia content relative to the basic mixture) stream at point 22, and a rich (high in ammonia content relative to the basic mixture) vapor stream at point 24. That is, the lean stream contains less ammonia by weight than the basic working fluid. By contrast, the rich stream contains more ammonia by weight that the basic working fluid. The lean stream passes into drain tank 116, and is then pumped by drain pump 118 to a higher pressure to create a pressurized lean stream at point 26. The pressurized lean stream is then sprayed or mixed with the rich vapor stream as they both enter the condenser 104 to create a combined stream at point 28. Spraying the lean liquid stream into the rich vapor stream can aid in condensing the rich vapor stream. The combined stream 28 is cooled within the condenser 104 by the external cooling source 124 to create the basic mixture at point 10. The basic mixture then enters the tank 120. The process is then repeated in a closed loop arrangement.

As mentioned above, the control system 130 can monitor the parameters of the working fluid at the various points in the Kalina Cycle 100. Additionally, the control system 130 can also monitor one or more of the heat source 122 temperature and the cooling source 124 temperature. Based on the measured parameters of the working fluid and the temperatures of the heating and cooling sources, the control system can optimize or otherwise modify the concentration of the working fluid to increase the efficiency of the Kalina Cycle 100. In other words, the control system 130 can increase or decrease the amount of ammonia in the basic working fluid mixture to influence the efficiency of the Kalina Cycle 100.

In order to aid in this process, the control system 130 can include a first sensor 128 that measures a parameter of the cooling source 124. A transmission mechanism A can transmit data recorded or measured by the sensor 128 to a control system processor or computer of the control system 130. The transmission mechanism A can send data to the system processor of the control system 130 via a universal serial bus (USB) connection, serial connection, parallel connection, wireless connection, Bluetooth connection, and/or any other communication connection.

In one embodiment, the sensor 128 can be a temperature sensor adapted to measure the temperature of the cooling source 124 and transmit the cooling source 124 temperature to the control system processor or computer of the control system 130. In another embodiment, sensor 128 can be adapted to measure other characteristics or parameters of the cooling source, such as fluid flow properties like flow rate for example. According to some implementations of the present invention, the control system processor of the control system 130 is located on site with the Kalina Cycle 100. According to alternative implementations of the present invention, the control system processor of the control system 130 is located remotely from the site of the Kalina Cycle 100.

Additionally, the control system 130 can include a sensor 132 that measures the density (or ammonia-water concentration) of the basic working fluid. A transmission mechanism B can transmit data recorded or measured by the sensor 132 to a control system processor or computer of the control system 130. The transmission mechanism B can send data to the system processor of the control system 130 via a universal serial bus (USB) connection, serial connection, parallel connection, wireless connection, Bluetooth connection, and/or any other communication connection.

The control system 130 can also include a drain tank level transmitter 134 that measures the level of the lean stream within the drain tank 116. A transmission mechanism can transmit data recorded or measured by the sensor 132 to a control system processor or computer of the control system 130. The transmission mechanism can send data to the system processor of the control system 130 via a universal serial bus (USB) connection, serial connection, parallel connection, wireless connection, Bluetooth connection, and/or any other communication connection. Furthermore, the control system 130 can include a drain tank level control valve 136, which allows the control system 130 to control the amount or level of the lean liquid stream within the drain tank 116.

Figure 2:
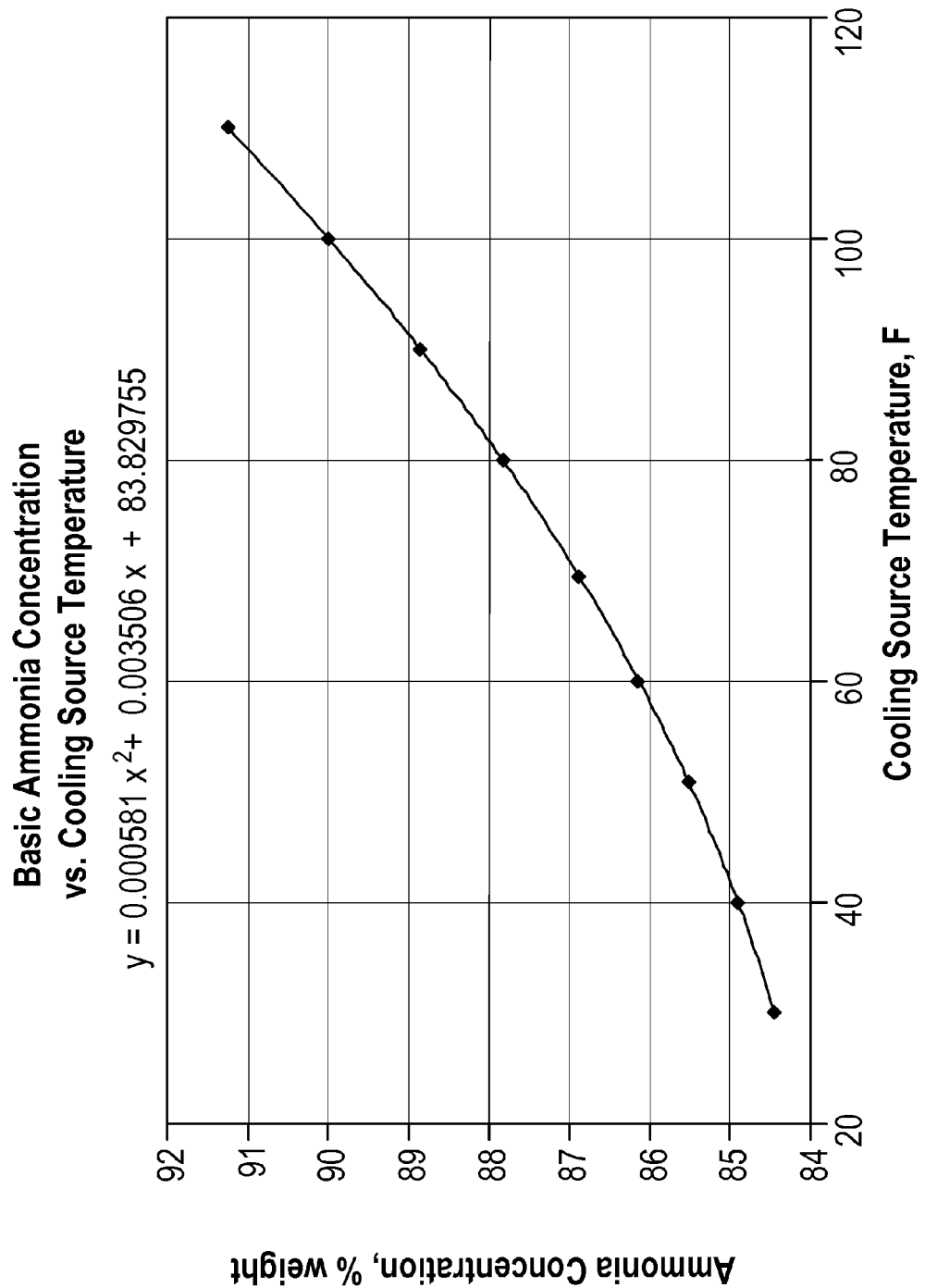
FIG. 2 illustrates an exemplary graph of a relationship between cooling source temperature and the ammonia concentration for the Kalina Cycle of FIG. 1 in accordance with an implementation of the present invention.

In operation the control system 130 can calculate, or can download, the relationship between the optimal basic mixture concentration (percent of ammonia in the basic mixture) and the cooling source temperature. A graph of this relationship for the Kalina Cycle 100 using an external heat source 122 having a temperature of 310° F. is illustrated in FIG. 2. The math function for the curve depicted in FIG. 2 is:

$$y=0.005811x^2+0.003506x+83.829755$$

where x equals the cooling source 124 temperature and y equals the ammonia concentration of the basic mixture. One will appreciate in light of the disclosure herein that the relationship depicted in FIG. 2 is an exemplary relationship for a particular Kalina Cycle, and that the control system 130 can use a similar relationship for the particular Kalina Cycle with which it is implemented.

Thus, in operation, the control system can measure the temperature of the cooling source 124 using the sensor 128. Based on the measured temperature, which according to one or more implementations of the present invention is an average temperature over a given period of time (e.g., 15 to 30 minutes), the processor of the control system 130 can calculate the optimal ammonia to water concentration of the basic mixture that will produce the maximum efficiency for the Kalina Cycle 100. The control system then measures the actual concentration of the basic mixture using sensor 132. Thereafter, the control system 130 can compare the optimal ammonia to water concentration with the actual ammonia to water concentration.

If the actual ammonia to water concentration is lower than the optimal ammonia to water concentration (i.e., there is less actual ammonia in the basic mixture then in the optimal mixture), the control system 130 can increase the ammonia concentration in the basic mixture. In particular, the control system 130 can determine the actual level of the lean stream in the drain tank 116 using the drain tank level transmitter 134. The control system 130 can then automatically set the target level of the drain tank to a "higher" set-point, and automatically adjust the drain tank level control valve 136 to maintain the new set-point level. In this case, the control system 130 will restrict the flow of the pressurized lean stream through the drain tank level control valve 136 until the level of the lean stream in the drain tank 116 reaches the new set-point level.

By increasing the amount of the lean stream stored in the drain tank 116, the control system 130 can reduce the water concentration in the working fluid cycling through the system 100 and thereby increase the ammonia concentration of the basic mixture. According to one or more implementations of the present invention, as more of the lean stream is stored within the drain tank 116, more of the basic mixture stored within the tank 120 is removed and allowed to circulate through the Kalina Cycle 100 to maintain a consistent amount of working fluid.

Figure 3:
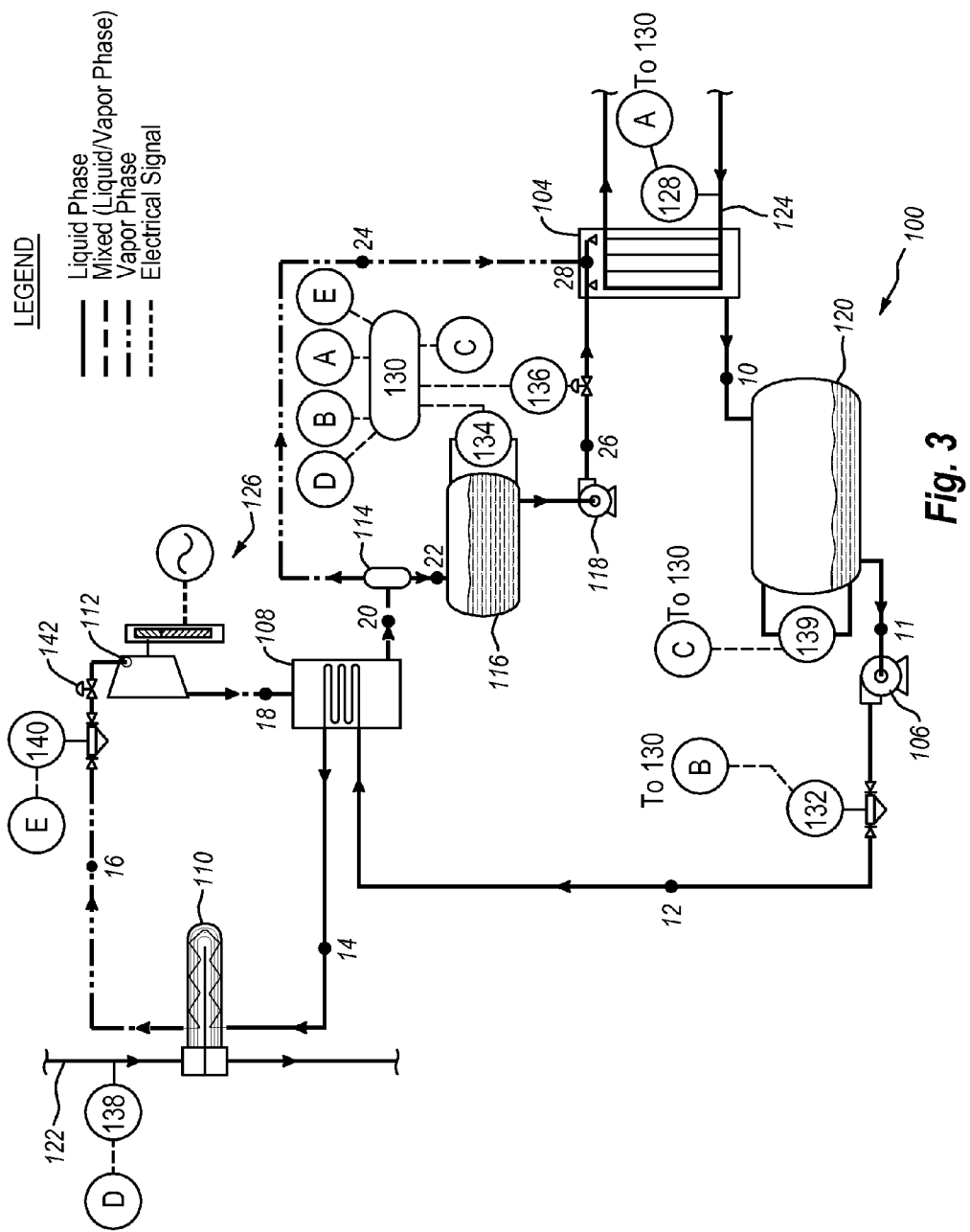
FIG. 3 illustrates a schematic diagram of the Kalina Cycle of FIG. 1 in which the control system has adjusted the concentration of the basic working fluid mixture in response to an increase in the temperature of the cooling source.

For example, FIG. 1 illustrates the Kalina Cycle 100 in which the control system has adjusted or optimized the concentration of the basic mixture to 86.9% ammonia and 13.1% water in light of a cooling source temperature of 70° F. In contrast, FIG. 3 illustrates the Kalina Cycle 100 in which the control system has adjusted the level of lean stream in the drain tank 116 in response to an increase in temperature of the cooling source 124 to 100° F. In particular, the control system has adjusted the concentration of the basic mixture to 90.0% ammonia and 10.0% water. As shown in a comparison of FIGS. 1 and 3, the Kalina Cycle 100 in FIG. 3 includes a greater amount of lean stream stored in the drain tank 116 compared to the Kalina Cycle 100 of FIG. 1. Along these lines, the Kalina Cycle 100 of FIG. 3 also has a smaller amount of basic mixture stored in tank 120, than the Kalina Cycle 100 of FIG. 1.

One will appreciate that while the control system 130 adjusts the concentration of the basic mixture, the equilibrium concentration (the ammonia-water mixture that would result if all the ammonia and water fluids within the various parts of the Kalina Cycle 100 were mixed together in a single vessel) can remain constant. In other words, the equilibrium composition is the average composition of fluid in the Kalina Cycle 100, if all of the fluids in the Kalina Cycle 100 were mixed together. This is because the Kalina Cycle 100 is a closed system. Thus, in order to allow the control system 130 to alter the concentration of the basic mixture, the Kalina Cycle 100 of the present invention may include an increased amount of working fluid when compared to a conventional Kalina Cycle. Along similar lines, both the drain tank 116 and the tank 120 can include substantially increased storing capacity to allow the Kalina Cycle 100 to store the additional working fluid.

One will appreciate in light of the disclosure herein, that the concentration of the lean stream and rich stream in the other parts of the Kalina Cycle 100 can automatically adjust based upon the concentration of the basic mixture. For example, the concentration of both the lean stream and the rich vapor stream can automatically adjust based on the concentration of the basic mixture as shown in FIGS. 1 and 3. For example, in some implementations of the present invention, the lean stream in the drain tank 116 of FIG. 1 can have a concentration of 56.6% ammonia and 43.4% water. This concentration can automatically adjust as the control system 130 changes the concentration of the basic working fluid. For instance, the lean stream in the drain tank 116 of FIG. 3 can automatically adjust to a concentration of 65.1% ammonia and 34.9% water.

Along similar lines, in one or more implementations, the rich stream at point 24 of FIG. 1 can have a concentration of 99.6% ammonia and 0.4% water. This concentration can automatically adjust as the control system 130 changes the concentration of the basic working fluid. For instance, the rich stream at point 24 of FIG. 3 can automatically adjust to a concentration of 99.7% ammonia and 0.3% water.

Similar to the process for increasing the ammonia concentration in the basic mixture due to an increase in cooling source 124 temperature, the control system 130 can also, or alternatively, reduce the ammonia concentration due to a decrease in cooling source 124 temperature. In particular, the control system 130 can measure the temperature of the cooling source 124 using the sensor 128. Based on the measured temperature, the processor of the control system 130 can calculate the optimal ammonia to water concentration of the basic mixture that produces the maximum efficiency for the Kalina Cycle 100. The control system 130 then can measure the actual concentration of the basic mixture using sensor 132. Thereafter, the control system 130 can compare the optimal ammonia to water concentration with the actual ammonia to water concentration.

If the actual ammonia concentration is greater than the optimal ammonia to water concentration (i.e., there is more ammonia in the basic mixture then in the optimal mixture), the control system 130 can decrease the ammonia concentration in the basic mixture. In particular, the control system 130 can determine the actual level of the lean stream in the drain tank 116 using the drain tank level transmitter 134. The control system can then automatically set the target level of the drain tank to a "lower" set-point, and automatically adjust the drain tank level control valve 136 to maintain the new set-point level. In this case, the control system 130 can increase the flow of the pressurized lean stream through the drain tank level control valve 136 until the level of the lean stream in the drain tank 116 reaches the new set-point level.

By decreasing the amount of the lean stream stored in the drain tank 116, the control system 130 can increase the water concentration in the working fluid cycling through the system 100, and thereby, decrease the ammonia concentration of the basic mixture. According to one or more implementations of the present invention, as less of the lean stream is stored within the drain tank 116, more of the basic mixture is stored within the tank 120 to maintain a consistent amount of working fluid circulating through the Kalina Cycle 100.

Figure 4:
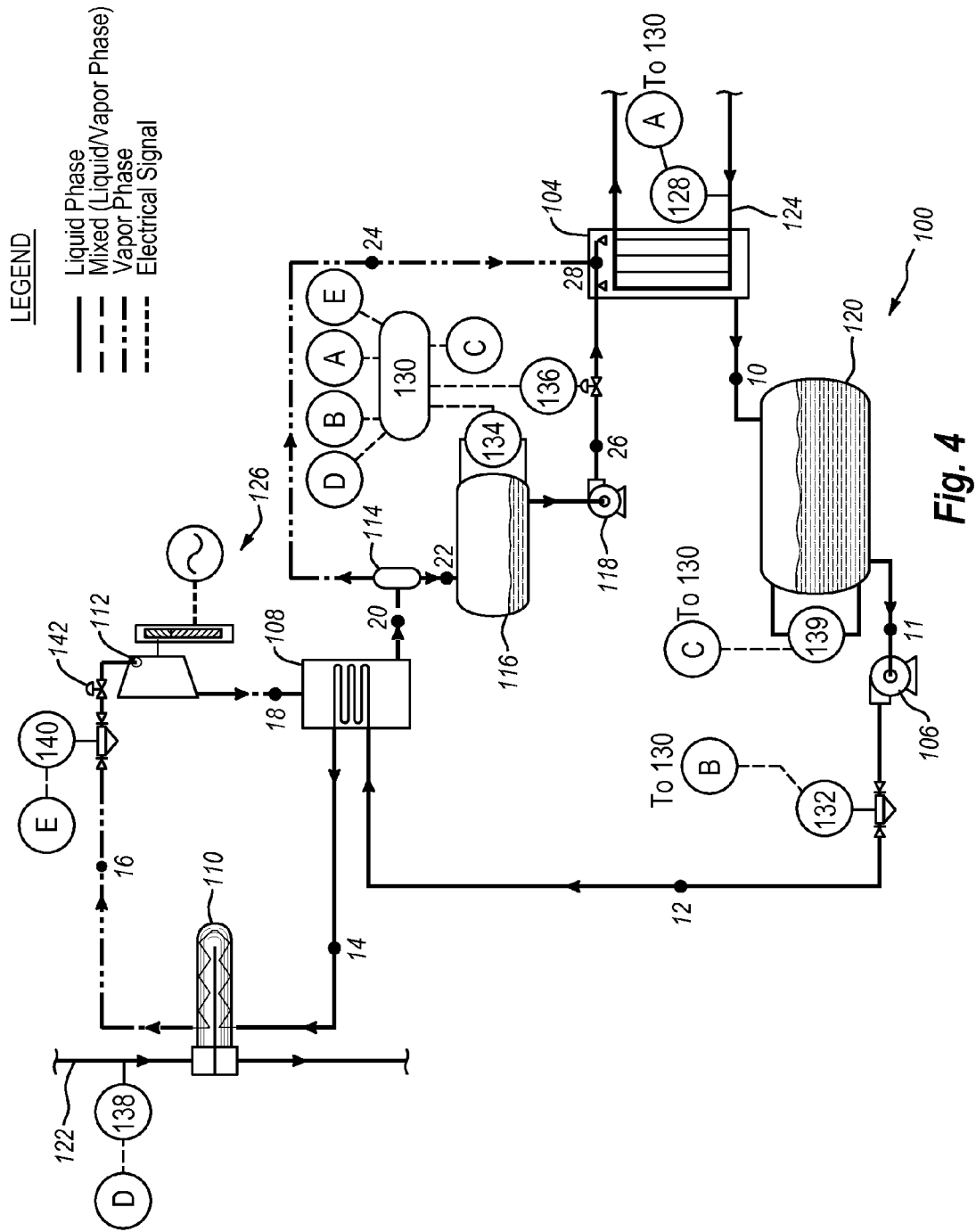
FIG. 4 illustrates a schematic diagram of the Kalina Cycle of FIG. 1 in which the control system has adjusted the concentration of the basic working fluid mixture in response to a decrease in the temperature of the cooling source.

For example, FIG. 4 illustrates the Kalina Cycle 100 in which the control system 130 has adjusted the level of lean stream in the drain tank 116 in response to a decrease in temperature of the cooling source 124 to 40° F. In particular, the control system 130 has adjusted the concentration of the basic mixture to 84.9% ammonia and 15.1% water. As shown in a comparison of FIGS. 1 and 4, the Kalina Cycle 100 in FIG. 4 includes a lesser amount of lean stream stored in the drain tank 116 compared to the Kalina Cycle 100 of FIG. 1. Along these lines, the Kalina Cycle 100 of FIG. 4 also has a greater amount of basic mixture stored in tank 120, than the Kalina Cycle 100 of FIG. 1.

As previously mentioned, upon adjustment of the concentration of the basic mixture, the concentration of the lean stream and rich stream in the other parts of the Kalina Cycle 100 can automatically adjust based upon the concentration of the basic mixture. For example, the concentration of both the lean stream and the rich vapor stream can automatically adjust based on the concentration of the basic mixture as shown in FIGS. 1 and 4. For example, in some implementations of the present invention, the lean stream in the drain tank 116 of FIG. 1 can have a concentration of 56.6% ammonia and 43.4% water. This concentration can automatically adjust as the control system 130 changes the concentration of the basic working fluid. For instance, the lean stream in the drain tank 116 of FIG. 4 can automatically adjust to a concentration of 51.0% ammonia and 49.0% water.

Along similar lines, in one or more implementations, the rich stream at point 24 of FIG. 1 can have a concentration of 99.6% ammonia and 0.4% water. This concentration can automatically adjust as the control system 130 changes the concentration of the basic working fluid. For instance, the rich stream at point 24 of FIG. 4 can automatically adjust to a concentration of 99.5% ammonia and 0.5% water.

While the control system 130 described herein above measures the temperature of the cooling source 124 and adjusts the concentration of the basic mixture in response, the present invention is not so limited. For example, instead of, or in addition to, measuring the temperature of the cooling source 124, the control system 130 can measure the temperature of the condensed working fluid exiting the condenser 124, or other related parameters. Furthermore, the control system 130 can include a tank level transmitter 139 for monitoring the amount of basic mixture stored in tank 120.

Additionally, instead of, or in addition to, adjusting the concentration of the basic mixture in response a change in the temperature of the cooling source 124, the control system 130 can adjust the concentration of the basic mixture in response to a change in the temperature of the heat source 122. In such implementations of the present invention, the control system 130 can include a sensor 138, such as a temperature sensor, that measures a parameter of the heating source 122, such as temperature, for example. A transmission mechanism D can send data from the sensor 138 to the system processor of the control system 130 via a universal serial bus (USB) connection, serial connection, parallel connection, wireless connection, Bluetooth connection, and/or any other communication connection. In alternative embodiments, sensor 138 can be adapted to measure flow rates and/or other characteristics or parameters of the heating source 122 which may influence the degree of heat transfer from the heat source 122 to the working stream.

Similar to as explained above in relation to a change in the cooling source 124 temperature, based on the measured heating source 122 temperature, the processor of the control system 130 can calculate the optimal ammonia to water concentration of the basic mixture that produces the maximum efficiency for the Kalina Cycle 100. The control system 130 then can measure the actual concentration of the basic mixture using sensor 132. Thereafter, the control system 130 can compare the optimal ammonia to water concentration with the actual ammonia to water concentration.

If the actual ammonia concentration is greater than the optimal ammonia to water concentration (i.e., there is more ammonia in the basic mixture then in the optimal mixture), the control system 130 can decrease the ammonia concentration in the basic mixture. In particular, the control system 130 can determine the actual level of the lean stream in the drain tank 116 using the drain tank level transmitter 134. The control system can then automatically set the target level of the drain tank to a "lower" set-point, and automatically adjust the drain tank level control valve 136 to maintain the new set-point level. In this case, the control system 130 can increase the flow of the pressurized lean stream through the drain tank level control valve 136 until the level of the lean stream in the drain tank 116 reaches the new set-point level.

Similarly, if the actual ammonia to water concentration is lower than the optimal ammonia to water concentration (i.e., there is less actual ammonia in the basic mixture then in the optimal mixture), the control system 130 can increase the ammonia concentration in the basic mixture. In particular, the control system 130 can determine the actual level of the lean stream in the drain tank 116 using the drain tank level transmitter 134. The control system 130 can then automatically set the target level of the drain tank to a "higher" set-point, and automatically adjust the drain tank level control valve 136 to maintain the new set-point level. In this case, the control system 130 will restrict the flow of the pressurized lean stream through the drain tank level control valve 136 until the level of the lean stream in the drain tank 116 reaches the new set-point level.

Additionally, the control system 130 can be programmed to "anticipate" normal cyclic changes in the cooling or heat source temperatures (or predicted temperature changes) in order to change the concentration in advance of real (or actual) cooling or heat source temperature changes. (For example for air cooled condenser applications, air temperature cycles during a given day can be very predicable, and thus a bias in the controls can be implemented for the anticipated "rising" temperature in the morning to early afternoon, and the "decreasing" temperature in the evening and night.)

Figure 5:
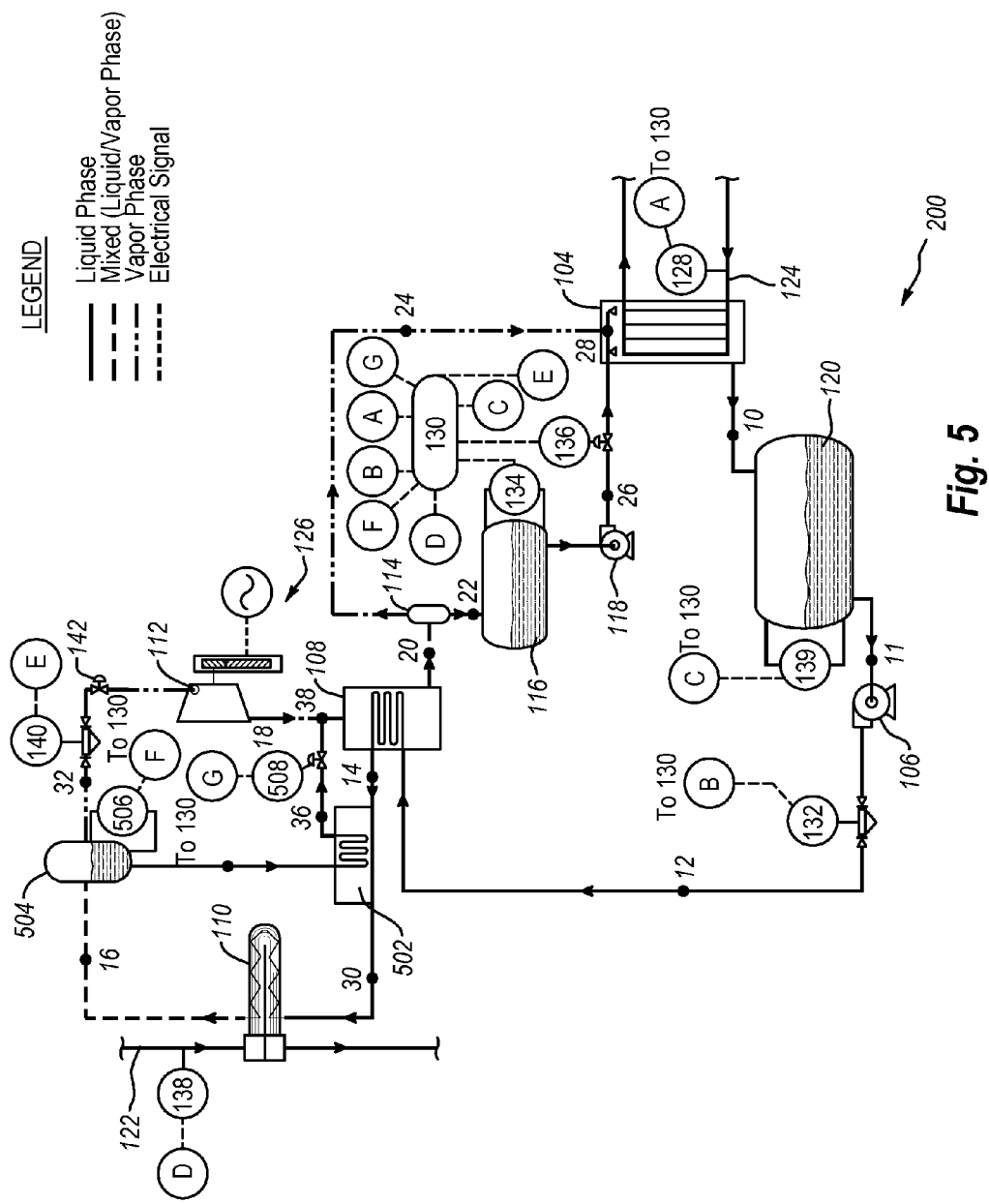
FIG. 5 illustrates a schematic diagram of another Kalina Cycle energy conversion system, including a control system in accordance with an implementation of the present invention.

Also, depending upon the type of Kalina Cycle and the various components included therein, the control system 130 can use other or additional components to adjust the concentration of the basic mixture to increase or optimize efficiency. For example, FIG. 5 illustrates a schematic diagram of a Kalina Cycle 200. The Kalina Cycle 200 is similar to the Kalina Cycle 100 illustrated in FIGS. 1, 3, and 4; however, it includes a fourth heat exchanger 502 and a separator 504.

Starting at the outlet of the condenser 104, the working fluid (an ammonia-water mixture) has a certain set of parameters at point 10, referred to herein after as the basic mixture. The working fluid is then pumped to a higher pressure by pump 106 to create a pressurized working fluid at point 12. The pressurized working fluid then passes through the second heat exchanger 108, where it is preheated to create a preheated working fluid at point 14.

The preheated working fluid then passes through the fourth heat exchanger 502 where it is further heated and optionally partially evaporated to create a further heated working fluid at point 30. The further heated working fluid is then passed through the third heat exchanger 110, where it is heated by the external heat source 122 to create an at least partially evaporated working stream at point 16. The at least partially evaporated working stream then passes into and through a separator 504. The separator 504 separates the at least partially evaporated working stream in to a rich vapor component at point 32, and a lean saturated liquid component at point 34. The rich vapor component enters and drives the turbine 112 to generate mechanical energy that is converted into electrical energy by a generator 126. Within the turbine 112, the working stream expands to a form a low-pressure working stream or spent stream at point 18.

The lean saturated liquid component is cooled in the fourth heat exchanger 502 (by heating the preheated working fluid) and creates a partially cooled lean component at point 36. The partially cooled lean component then is combined with the low-pressure working stream or spent stream to create a combined spent stream at point 38, which then passes through the second heat exchanger 108 where it is cooled by heating the pressurized working fluid to create a partially condensed working stream at point 20.

The partially condensed working stream then enters separator 114. The separator 114 divides the partially condensed working stream into a lean (low in ammonia content relative to the basic mixture) liquid stream at point 22, and a rich (high in ammonia content relative to the basic mixture) vapor stream at point 24. The lean stream passes into drain tank 116, and is then pumped by drain pump 118 to a higher pressure to create a pressurized lean stream at point 26. The pressurized lean stream is then sprayed or mixed with the rich vapor stream as they both enter the condenser 104 to create a combined stream at point 28. Spraying the lean liquid stream into the rich vapor stream can aid in condensing the rich vapor stream. The combined stream 28 is cooled within the condenser 104 by the external cooling source 124. The cooled combined stream becomes the basic mixture upon exiting the condenser 104, which then enters the tank 120. The process is then repeated in a closed loop arrangement.

Additionally, as shown in FIG. 5, the control system 130 can include a first separator tank level transmitter 506 that measures the level of the lean saturated liquid component within the separator 504. A transmission mechanism F can send data from the separator tank level transmitter 506 to the system processor of the control system 130 via a universal serial bus (USB) connection, serial connection, parallel connection, wireless connection, Bluetooth connection, and/or any other communication connection. Furthermore, the control system 130 can include a separator tank level control valve 508, which allows the control system 130 to control the amount of lean saturated liquid component within the tank of the separator 504 via a control mechanism G. The control mechanism G can comprise a communication mechanism similar to those described above in relation to transmission mechanisms A, C, D, and E, and an actuator adapted to open and close the valve 508.

Thus, in the implementation of the control system 130 illustrated in FIG. 5, the control system 130 can adjust the level of lean saturated liquid component within the separator 504 to adjust the concentration of the basic mixture in response to a change in the temperature of the cooling source 124 and/or the heat source 122. One will appreciate in light of the disclosure herein that the control system 130 can adjust the level of the lean saturated liquid component within the tank of the separator 504 in a manner similar to that described above in relation to the adjusting the level of the lean stream within the drain tank 116. In particular, the control system 130 can set a target level and then adjust the separator tank level control valve 508 accordingly so the level of fluid within the tank of the separator 504 either increases or decreases. Alternatively, the control system 130 can adjust both the level of the lean saturated liquid component within the separator 504 and the level of the lean stream in the drain tank 116 to adjust the concentration of the basic mixture.

One will appreciate in light of the disclosure herein, that the control system 130 can rapidly adjust the concentration of the basic mixture. Indeed, in one or more implementations of the present invention, the control system 130 can adjust the concentration of the basic mixture daily, hourly, or in response to a temperature change of one or more of the heat source 122 and cooling source 124. In one or more implementations of the present invention, the control system 130 can monitor and adjust the basic mixture in response to a temperature change of one or more of the heat source 122 and cooling source 124 in real time.

Figure 6:
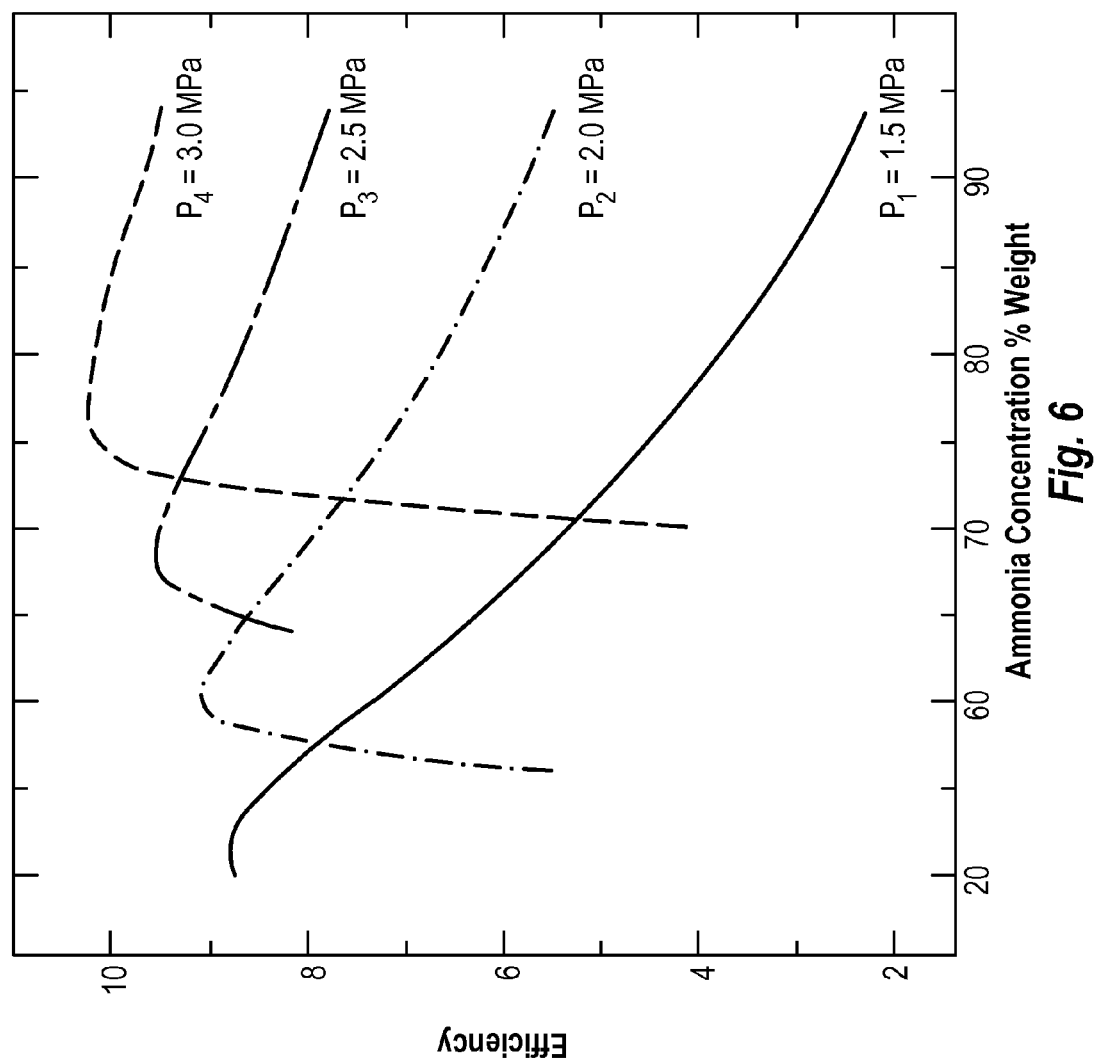
FIG. 6 illustrates an exemplary graph of a potential relationship between ammonia concentration and efficiency of a Kalina Cycle at different turbine inlet pressures.

While the implementations of the control system 130 described above monitor and automatically adjust the concentration of the basic mixture to help ensure the Kalina Cycle 100 and/or 200 is running at an increased or maximum efficiency, one or more additional or alternative implementations of the present invention include control systems that adjust one or more additional parameters of the Kalina Cycle to help ensure an increased or maximum efficiency. For example, FIG. 6 depicts a graph illustrating a potential relationship between ammonia concentration of working fluid and efficiency of a Kalina Cycle based upon the pressure of the working fluid at the turbine inlet. One or more implementations of a control system 130 of the present invention can calculate or download a similar relationship based upon the particular parameters of the Kalina Cycle which it controls. Using this information, the control system 130 can monitor the concentration of the basic mixture and automatically adjust the pressure at the turbine inlet accordingly to help ensure that the Kalina Cycle runs at an increased or maximum efficiency.

For example, referring again to FIG. 1, the control system 130 can monitor the concentration of the basic mixture using the sensor 132. Furthermore, according to one or more implementations of the present invention the sensor 132 can also measure the temperature and flow rate of the basic mixture. Based upon the measured concentration of the basic mixture, the processor of the control system 130 can calculate the turbine inlet pressure that will maximize the efficiency of the Kalina Cycle 100 using the graph illustrated in FIG. 6 or similar data. The control system 130 can then measure the actual pressure at the turbine 112 using a turbine inlet pressure sensor 140. A transmission mechanism E can send data from the sensor 140 to the system processor of the control system 130 via a universal serial bus (USB) connection, serial connection, parallel connection, wireless connection, Bluetooth connection, and/or any other communication connection. According to some implementations of the present invention, the control system 130 can measure the flow rate of the working fluid at the turbine 112 inlet and then calculate the pressure.

If the actual turbine inlet pressure is greater (or lower) than the optimal turbine inlet pressure, the control system 130 can adjust the actual turbine inlet pressure. For example, the control system 130 can adjust the output of pump 106, and thus, adjust the turbine inlet pressure. In any event, the control system 130 can monitor and adjust the turbine inlet pressure to help ensure the Kalina Cycle is running at maximum efficiency.

One will appreciate in light of the disclosure herein that the concentration and turbine inlet pressure are just two exemplary parameters that the control system 130 of the present invention can monitor and automatically adjust to maximize the efficiency of a Kalina Cycle. Indeed, one or more implementations of the present invention can monitor any number of different cycle parameters upon which the efficiency of a given Kalina Cycle is based and automatically adjust the parameters to help the efficiency of the Kalina Cycle.

For example, the Kalina Cycle has been described herein as a closed cycle; however, because turbine seals are imperfect, small amounts of rich vapor being expanded in the turbine can escape from the Kalina Cycle. Overtime this loss of working fluid can have negative affects on the operating efficiency of the Kalina Cycle by both reducing the amount of working fluid circulating through the Kalina Cycle and by adjusting the concentration of the working fluid. One or more implementations of the present invention can monitor the amount of working fluid circulating in the Kalina Cycle by using the drain tank level transmitter 134 and the tank level transmitter 139. The control system 130 can then use the drain tank level control valve 136 to allow more working fluid to circulate in the Kalina Cycle, and thereby, account for any losses via the turbine seals. Additionally, the control system 130 can adjust the concentration of the basic mixture as described herein above to compensate for any change due to rich vapor leaking at the turbine seals.

Implementations of the present invention can also include methods of implementing and increasing the efficiency of a thermodynamic cycle. The following describes at least one implementation of a method of increasing the efficiency of a Kalina cycle with reference to the components and diagrams of FIGS. 1 through 6. Of course, as a preliminary matter, one of ordinary skill in the art will recognize that the methods explained in detail herein can be modified. For example, various acts of the method described can be omitted or expanded, and the order of the various acts of the method described can be altered as desired.

Thus, according to one method of the present invention, the method can include an act of collecting data at one or more sensors indicative of one or more parameters of the Kalina Cycle upon which the efficiency of the Kalina Cycle depends. For example, the method can include measuring the temperature of one or more of a heat source 122 and a cooling source 124 using one or more temperature sensors 128, 138. Additionally, the method can include measuring the density of a basic working fluid mixture of the Kalina Cycle using a density sensor 132. Furthermore, the method can include measuring a turbine inlet pressure of a working fluid of the Kalina Cycle using a pressure sensor 140.

The method can also include an act of transmitting the data to a control system processor using one or more transmission mechanisms. For instance, the method can include transmitting the temperature of one or more of a heat source 122 and a cooling source 124 to a processor of a control system 130 using a transmission mechanism A, D. Additionally, or alternatively, the method can include transmitting the concentration of a working fluid to a processor of a control system 130 using transmission mechanism B. Furthermore, the method can include transmitting a turbine inlet pressure of a working fluid to a processor of a control system 130 using transmission mechanism E.

The method can additionally include an act of calculating one or more actual parameters based upon the data using a control system processor. For example, the method can include calculating the actual concentration of the working fluid, the actual amount of working fluid within the Kalina Cycle, or the actual pressure of the working fluid at a turbine inlet.

Furthermore, the method can include an act of determining one or more optimal parameters that will increase the efficiency of the Kalina Cycle. For instance, the method can involve calculating an optimum working fluid concentration based on the actual temperature of the heating and/or cooling source. Additionally, or alternatively, the method can include calculating an optimum working fluid concentration based on the actual pressure of the working fluid at the turbine inlet.

The method can also include an act of automatically adjusting the one or more actual parameters to the one or more optimal parameters. For example, the method can include adjusting the concentration of the basic working fluid mixture by manipulating a drain tank control valve 136 or a separator tank level control valve 508. Additionally, or alternatively, the method can include adjusting the turbine inlet pressure of a working fluid of the Kalina Cycle by adjusting the output of a pump 106.

As described above, Kalina Cycle can include methods and systems for adjusting concentration levels of the working fluid in response to temperature changes of the heat source and/or of the cooling source. For instance, the control system can increase concentration of ammonia, with increased temperature of the cooling source, in order to maximize or increase the amount of energy generated by the Kalina Cycle. In particular, one or more implementations include a Kalina Cycle system that may require a relatively large amount of ammonia in order to increase the total ammonia concentration within the system. In at least one implementation, the Kalina Cycle system can include one or more external storage tanks, which can accommodate storage of fluid. More specifically, the Kalina Cycle system can incorporate one or more lean stream (or lean fluid) storage tanks and/or one or more rich fluid storage tanks. The external storage tanks can facilitate addition of fluid with high and/or low ammonia concentration into the Kalina Cycle. The external storage tanks also can facilitate removal of fluid with high and/or low ammonia concentration from the Kalina Cycle. Accordingly, the external storage tanks can provide additional flexibility to the Kalina Cycle (especially in large systems), which may allow the Kalina Cycle to operate more efficiently in environments that have relatively large temperature fluctuations.

Figure 7:
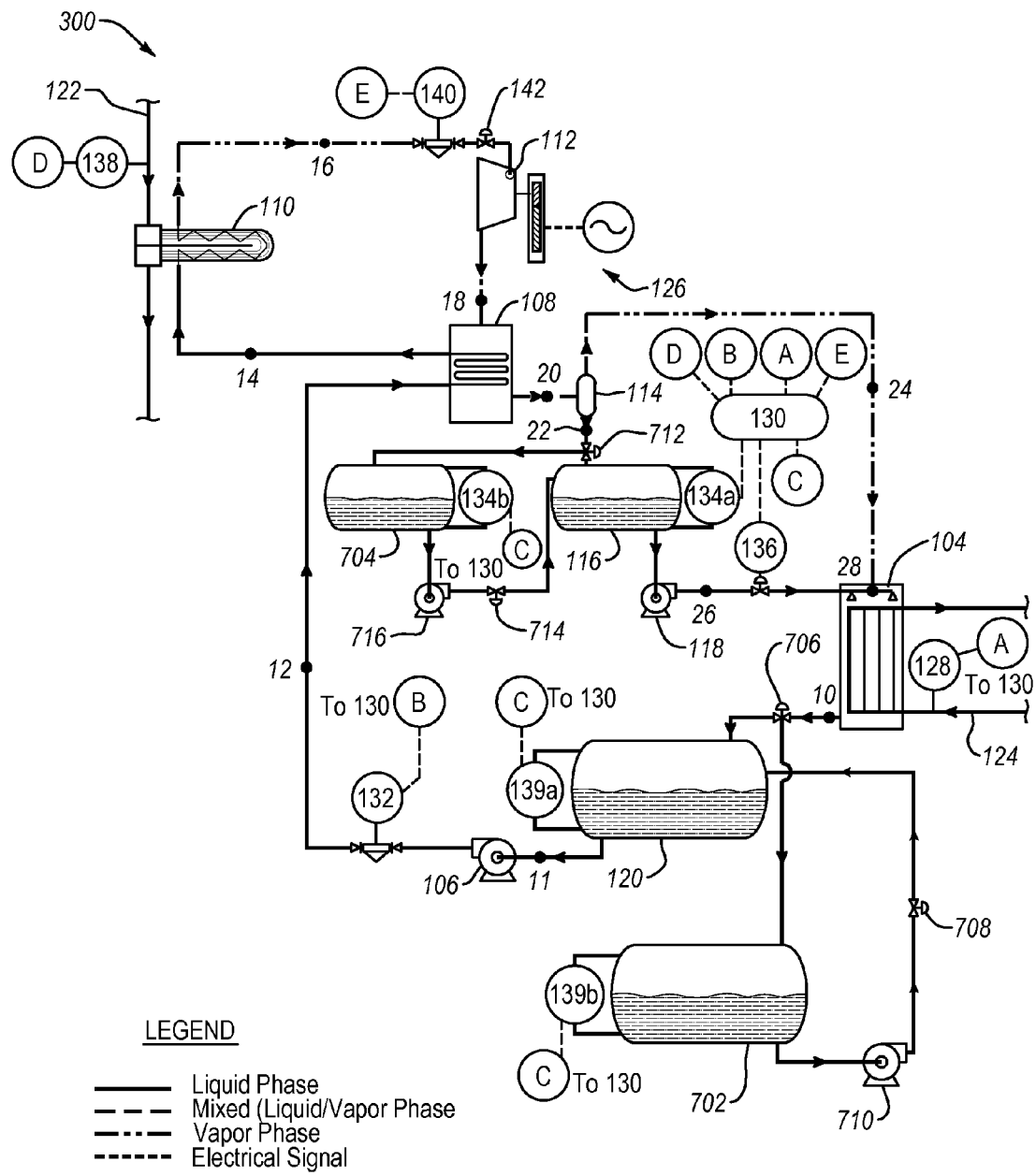
FIG. 7 illustrates a schematic diagram of yet another Kalina Cycle energy conversion system, including a control system in accordance with an implementation of the present invention.

For example, similar to the Kalina Cycle 100 (FIG. 1), as illustrated in FIG. 7, a Kalina Cycle 300 can include a first heat exchanger or condenser 104, a feed pump 106, a second heat exchanger 108, the third heat exchanger or evaporator 110, and a turbine 112. The Kalina Cycle 300 also can include a separator 114, a drain tank 116, a drain pump 118, and a tank 120. As explained above in connection with the Kalina Cycle 100 (FIG. 1), the Kalina Cycle 300 also can work with the external heating source 122 and the external cooling source 124.

Additionally, the Kalina Cycle 300 can include a rich fluid external storage tank 702 and a lean fluid external storage tank 704. The Kalina Cycle 300 can have one or more connections from the rich fluid external storage tank 702 to the tank 120, as further described below. Similarly, the Kalina Cycle 300 also can provide one or more connections from the lean fluid external storage tank 704 to the drain tank drain tank 116.

Starting at the outlet of the condenser 104, the working fluid has a certain set of parameters at points 10, 11. The working fluid is then pumped to a higher pressure by the feed pump 106, to create a pressurized working fluid at point 12. The pressurized working fluid then passes through the second heat exchanger 108, where it is preheated to create the preheated working fluid at point 14.

The preheated working fluid is then passed through the evaporator 110, where it is heated by the external heat source 122 to create an at least partially evaporated working stream at point 16. The at least partially evaporated working stream enters and drives the turbine 112 to generate mechanical energy that is converted into electrical energy by the generator 126. Within the turbine 112, the working stream expands to a form the low-pressure working stream or spent stream at point 18.

The low-pressure working stream then passes through the secondary side of the second heat exchanger 108 to preheat the pressurized working fluid, as mentioned above. By preheating the pressurized working stream, the low-pressure working stream is cooled to create a partially condensed working stream or cooled spent stream at point 20. The partially condensed working stream then enters the separator 114. The separator 114 divides the partially condensed working stream into the lean (low in ammonia content relative to the basic mixture) stream at point 22, and the rich (high in ammonia content relative to the basic mixture) vapor stream at point 24.

The lean stream can pass into the drain tank 116, and can be then pumped by the drain pump 118 to a higher pressure to create a pressurized lean stream at point 26. Additionally or alternatively, as further described below, the lean stream can pass into the lean fluid external storage tank 704. The pumped and pressurized lean liquid stream (at point 26) is then sprayed or mixed with the rich vapor stream as they both enter the condenser 104 to create a combined stream at point 28. Spraying the lean liquid stream into the rich vapor stream can aid in condensing the rich vapor stream. The combined stream is cooled within the condenser 104 by the external cooling source 124 to create the basic mixture at point 10. Subsequently, the basic mixture at point 10 can enter the tank 120 and/or the rich fluid external storage tank 702. The process is then repeated in a closed loop arrangement.

To adjust the concentration of the basic working fluid, as described above, the control system 130 can adjust the amount of lean stream stored in the drain tank 116. More specifically, to increase concentration of ammonia in the basic working fluid control system 130, using the drain tank level transmitter 134a, can automatically increase the level of lean stream stored in the drain tank 116. Conversely, to decrease concentration of ammonia in the working fluid, control system 130 can decrease the amount of lean stream stored in the drain tank 116.

The rich fluid external storage tank 702 and the lean fluid external storage tank 704 can be considered to be external to the Kalina Cycle 300. Accordingly, any fluid circulating through the Kalina Cycle 300 during normal operation of the Kalina Cycle 300 may not enter the rich fluid external storage tank 702 and the lean fluid external storage tank 704. In other words, the equilibrium concentration of the fluid within the Kalina Cycle 300 can be a fixed value, while the fluid circulates in a closed loop system, which does not include the rich fluid external storage tank 702 and the lean fluid external storage tank 704.

Thus, one will appreciate that without adding or removing fluid from the rich fluid external storage tank 702 and/or lean fluid external storage tank 704, the control system 130 can adjust the concentration of the basic mixture as described above. When doing so the equilibrium concentration (the ammonia-water mixture that would result if all the ammonia and water fluids within the various parts of the Kalina Cycle 300 (except the rich fluid external storage tank 702 and lean fluid external storage tank 704) were mixed together in a single vessel) can remain constant. By contrast, however, adding fluid from the rich fluid external storage tank 702 and/or lean fluid external storage tank 704 can change the equilibrium concentration. Similarly removing fluid into the rich fluid external storage tank 702 and/or lean fluid external storage tank 704 also can change the equilibrium concentration.

More specifically, the control system 130 can use the tank level transmitter 139b to determine the amount of rich fluid in the rich fluid external storage tank 702. Accordingly, the control system can regulate the amount of rich fluid that enters and/or exits the rich fluid external storage tank 702 (i.e., the amount of fluid added to or removed from the Kalina Cycle 300). Similarly, the lean fluid storage tank level transmitter 134b can allow the control system 130 to determine the amount of lean fluid entering and/or exiting the lean fluid external storage tank 704 by monitoring the level of the lean fluid external storage tank 704. Thus, the control system 130 can control the amount of lean fluid entering and/or exiting the Kalina Cycle 300.

For instance, the control system 130 can increase the concentration of the basic working fluid by adding rich fluid from the rich fluid external storage tank 702 into the tank 120. Thus, the control system 130 can increase the overall equilibrium concentration of the Kalina Cycle 300. In at least one implementation, the rich fluid can have 60.9% ammonia. Alternatively, the rich fluid also can have higher and lower concentrations than 60.9% of ammonia. Additionally or alternatively, the control system 130 can increase the overall equilibrium concentration of the Kalina Cycle 300 by removing the lean fluid from the Kalina Cycle 300 and into the lean fluid external storage tank 704. Therefore, by increasing the overall equilibrium concentration of the Kalina Cycle 300, the control system 130 also can increase the maximum concentration of the basic working fluid.

Similarly, the control system 130 can reduce the overall equilibrium concentration of the Kalina Cycle 300 by adding lean fluid from the lean fluid external storage tank 704 into the Kalina Cycle 300 system. Additionally or alternatively, removing working fluid into the rich fluid external storage tank 702, which has a higher ammonia concentration than the lean fluid, also can reduce the overall equilibrium concentration of the Kalina Cycle 300.

For example, the Kalina Cycle 300 can include a valve 706, which can regulate the direction of flow of the basic fluid from point 10 into the tank 120 and/or into the rich fluid external storage tank 702. Control system 130 can control the valve 706, and can allow the working fluid from point 10 to flow into the tank 120, the rich fluid external storage tank 702, or a combination thereof. Additionally, the Kalina Cycle 300 can include a rich fluid storage tank level control valve 708 and feed pump 710. In particular, the feed pump 710 can pump the rich fluid from the rich fluid external storage tank 702 into the tank 120. The control system 130 can activate the feed pump 710 as well as open the rich fluid storage tank level control valve 708 to add rich fluid to the Kalina Cycle 300.

Kalina Cycle 300 also can include a valve 712 which can regulate the flow of the lean stream (at point 22) from the separator 114 into the drain tank 116 and/or into the lean fluid external storage tank 704. More specifically, the control system 130 can control the valve 712 to allow the lean stream from the separator 114 to flow into the drain tank 116 and/or into the lean fluid external storage tank 704. Additionally, the Kalina Cycle 300 can include a lean fluid storage tank level control valve 714 and a feed pump 716. Particularly, control system can activate the feed pump 716 and open the lean fluid storage tank level control valve 714 to add the lean fluid into the Kalina Cycle 300.

Figure 8A:
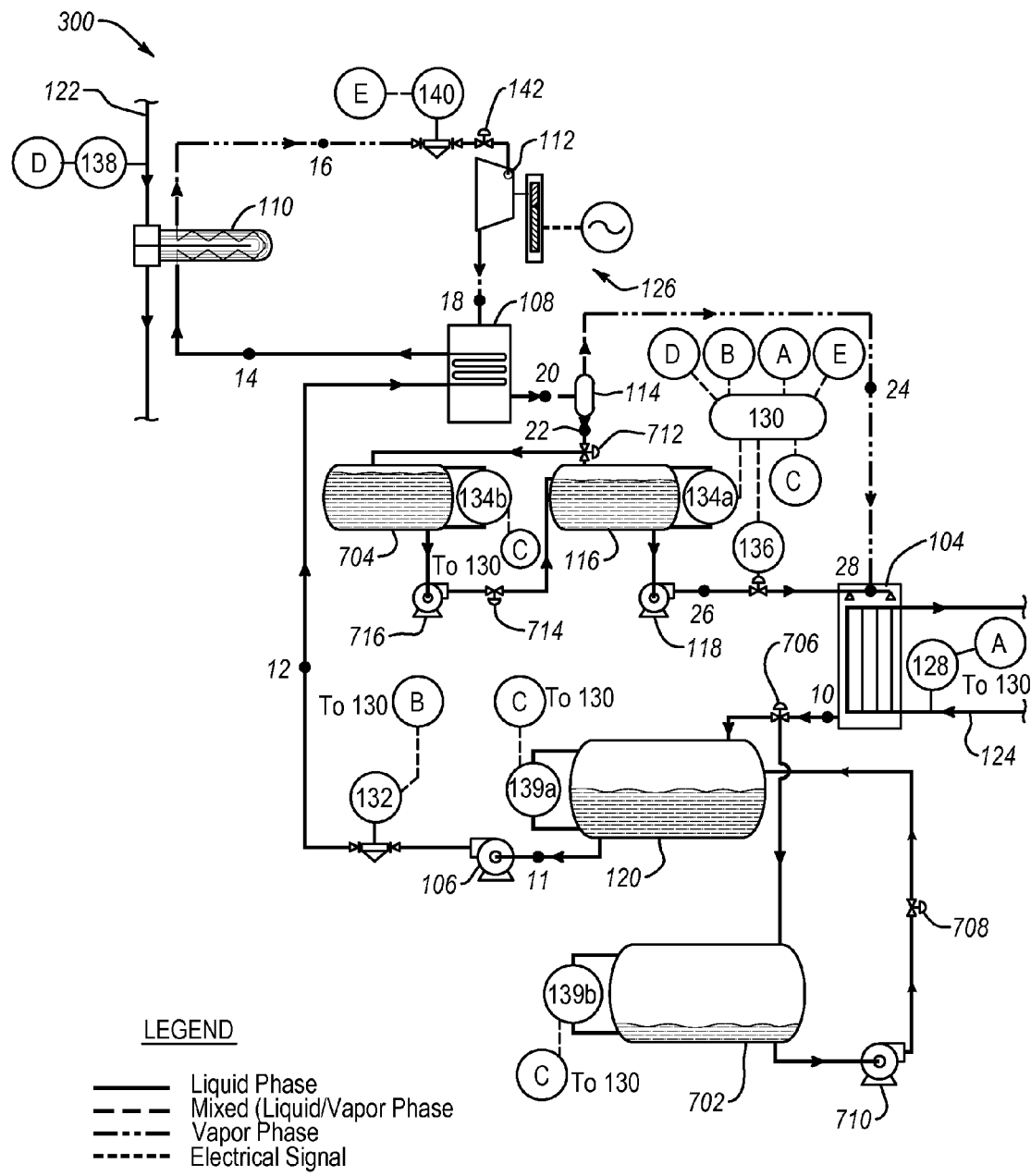
FIG. 8A illustrates a schematic diagram of the Kalina Cycle of FIG. 7 in which the control system has increased an equilibrium concentration and increased the concentration of the basic working fluid mixture.

For example, FIG. 8A illustrates the Kalina Cycle 300, which has an adjusted overall equilibrium concentration of the fluid. In particular, FIG. 8A illustrates the Kalina Cycle 300 that has an increased overall equilibrium concentration (as compared with the equilibrium concentration illustrate in FIG. 7). To increase the overall equilibrium concentration of the Kalina Cycle 300, rich fluid from the rich fluid external storage tank 702 can flow into the tank 120, as described above. Additionally or alternatively, lean stream or lean fluid can flow out of the Kalina Cycle 300 and into the lean fluid external storage tank 704.

In one or more implementations, the system capacity may be insufficient to accommodate addition of rich fluid without removal of the lean stream therefrom (e.g., in order to achieve a desired equilibrium concentration). Removing the lean stream from the Kalina Cycle 300 can provide additional space in the drain tank 116, which would be otherwise occupied with the lean stream stored therein. Such additional space can allow the control system 130 to further increase the concentration of the basic working fluid by increasing the level of lean stream in the drain tank 116 (which would not be possible without removal of the lean stream from the Kalina Cycle). More specifically, as described above and as illustrated in FIG. 8A, the control valve 136 can allow the control system 130 to increase the amount of lean stream in the drain tank 116.

In at least one implementation, to increase the overall equilibrium concentration, the control system 130 can remove the lean stream from the Kalina Cycle 300 into the lean fluid external storage tank 704 and add rich fluid from the rich fluid external storage tank 702. The removal of the lean stream and addition of the rich fluid can occur concurrently or may be sequential (e.g., the lean stream may be removed from the Kalina Cycle 300 and, subsequently, the rich fluid may be added). Alternatively, however, control system 130 can increase the overall equilibrium concentration either by removing the lean stream from the Kalina Cycle 300 into the lean fluid external storage tank 704 or by adding rich fluid from the rich fluid external storage tank 702.

Figure 8B:
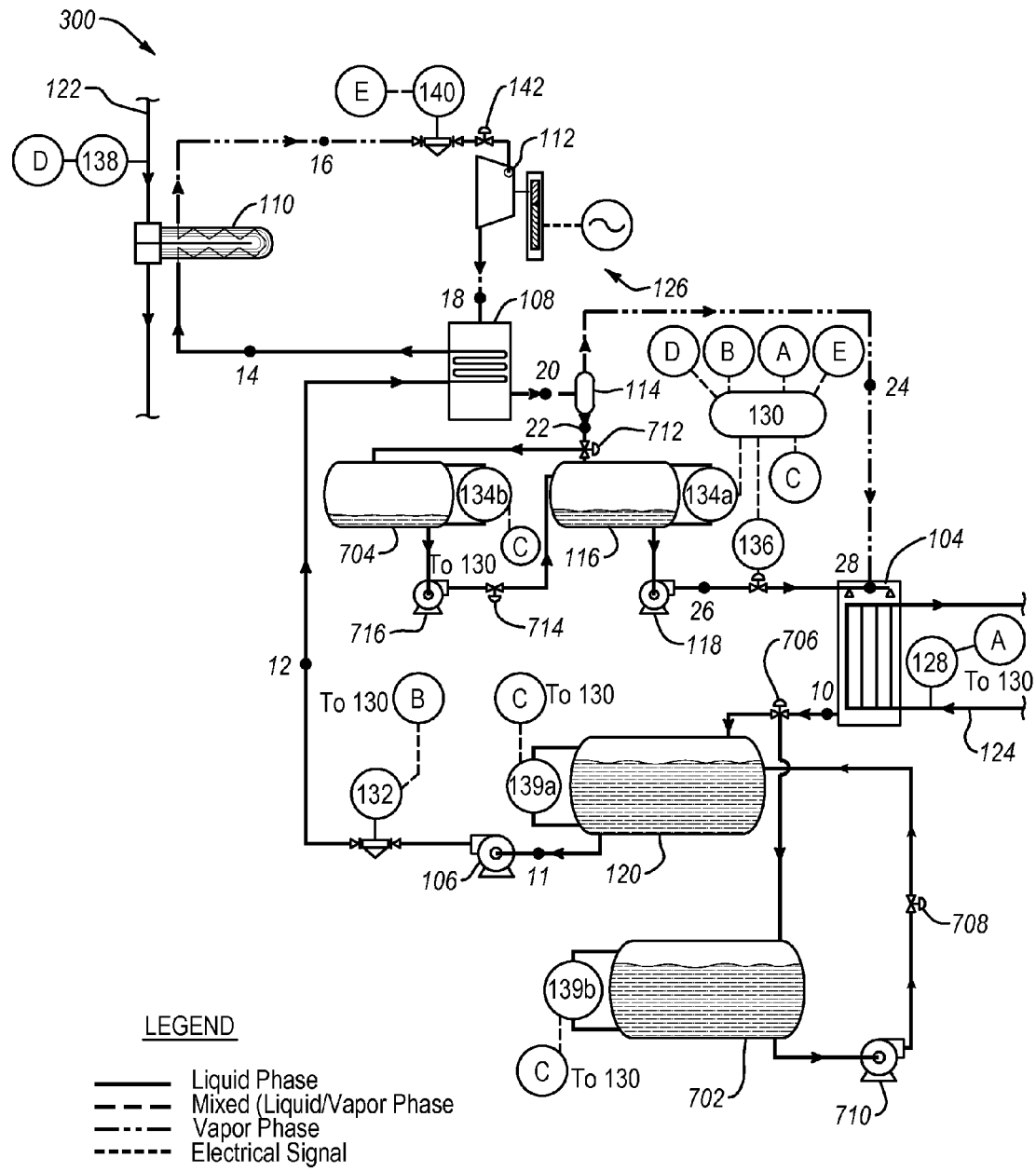
FIG. 8B illustrates a schematic diagram of the Kalina Cycle of FIG. 7 in which the control system has decreased an equilibrium concentration and decreased the concentration of the basic working fluid mixture.

As described above, the control system 130 also can decrease the overall equilibrium concentration in the Kalina Cycle 300. For instance, as illustrated in FIG. 8B, the control system 130 can add the lean fluid to the Kalina Cycle 300, by activating the feed pump 716 and opening the valve 712, thereby pumping the lean fluid into the drain tank 116 and reducing the overall equilibrium concentration. Similarly, to reduce the overall equilibrium concentration, the control system 130 can remove a desired amount of the basic working fluid from the Kalina Cycle 300, for example, by controlling valve 706 to allow the basic working fluid to flow into the rich fluid external storage tank 702.

Additionally or alternatively, the control system 130 can reduce the overall equilibrium concentration of the fluid in the Kalina Cycle 300 by removing a desired amount of the working fluid from the Kalina Cycle 300. In particular, the control system 130 can (at least partially) open the valve 706 to allow at least some (or a desired amount of) basic working fluid to flow into the rich fluid external storage tank 702, thereby reducing the overall equilibrium concentration of the Kalina Cycle 300. Moreover, as described above, the control system 130 can regulate the level of the rich fluid in the rich fluid external storage tank 702, thereby regulating the amount of rich (or working) fluid added to or removed from the Kalina Cycle 300.

After reducing the total amount of fluid present in the Kalina Cycle 300 will be reduced by the amount of the working fluid removed into the rich fluid external storage tank 702, the concentration of the working fluid can be more sensitive to changes in the level of the lean stream in the drain tank 116. More specifically, reducing the level of lean stream contained within the drain tank 116 can reduce the concentration of the basic working fluid by a greater amount than without removal of the working fluid from the Kalina Cycle 300. Furthermore, as noted above, to reduce the overall equilibrium concentration, the control system 130 can add the lean fluid into the Kalina Cycle 300, from the lean fluid external storage tank 704, and remove working fluid from the Kalina Cycle 300 into the rich fluid storage tanks 702.

Accordingly, the control system 130 can increase or decrease the overall equilibrium concentration of the Kalina Cycle 300 by adding fluids to and/or removing fluids from the Kalina Cycle 300, as described above. Thus, incorporating the rich fluid external storage tank 702 and/or lean fluid external storage tank 704 can increase flexibility of the Kalina Cycle 300, by allowing the control system 130 to change the equilibrium concentration of the system. Additionally, incorporating the rich fluid external storage tank 702 and/or the lean fluid external storage tank 704 can allow an operator to service the Kalina Cycle 300. More specifically, the operator can remove fluids from the entire or a portion of the Kalina Cycle 300 into the rich fluid external storage tank 702 and/or into the lean fluid external storage tank 704. Hence, the operator can service and/or repair the Kalina Cycle 300 (or portions thereof) without additional storage equipment.

Figure 9:
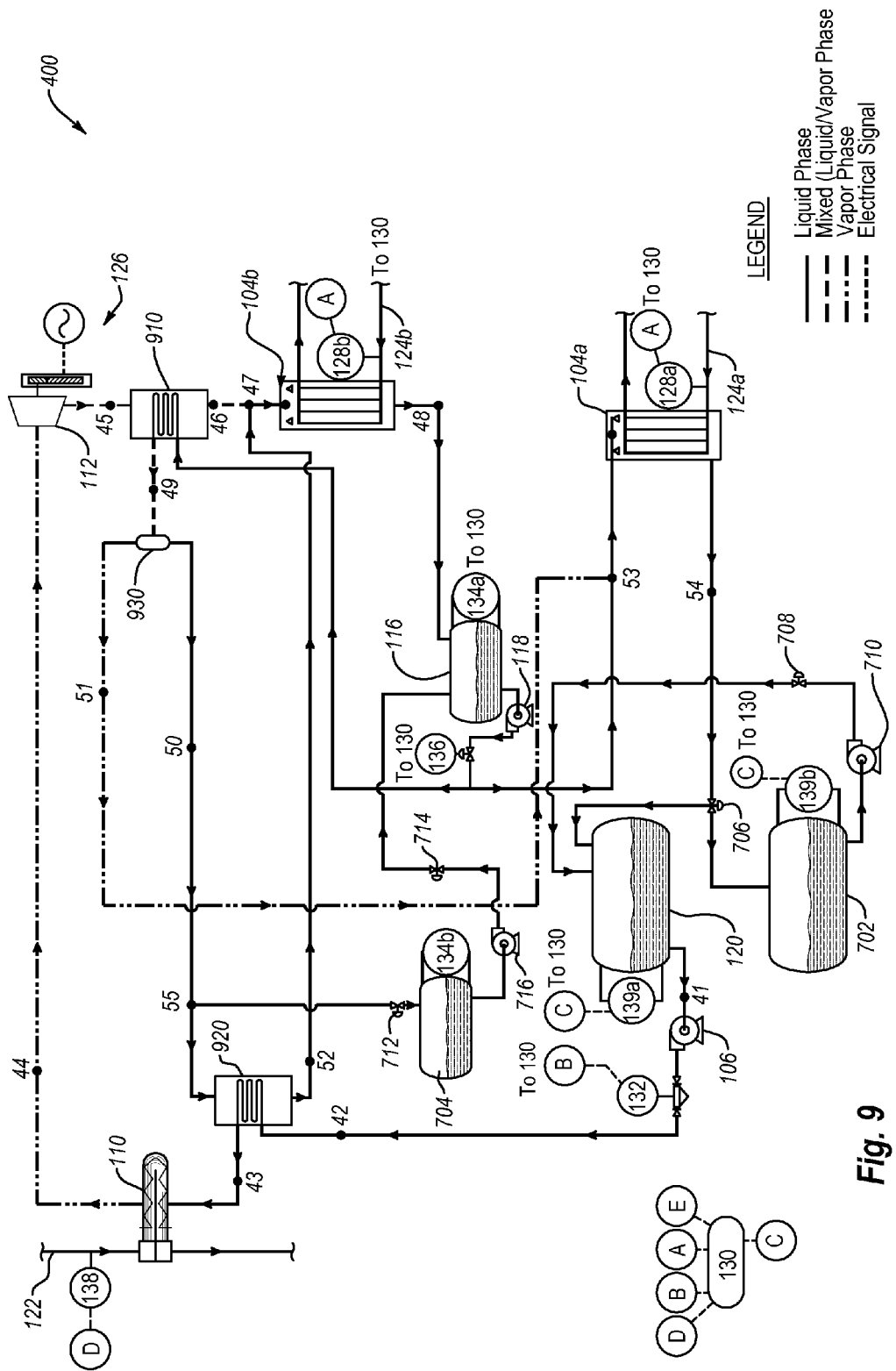
FIG. 9 illustrates a schematic diagram of still one other Kalina Cycle energy conversion system, including a control system in accordance with an implementation of the present invention.

The above-referenced figures and related text describe some of the exemplary implementations of the Kalina Cycle. In one or more implementations, the Kalina Cycle also may incorporate additional elements and/or may have a different configuration. For example, FIG. 9 illustrates a Kalina Cycle 400 that incorporates multiple cooling sources. In particular, the Kalina Cycle 400 incorporates cooling sources 124a, 124b, which can enter heat exchanges or condensers 104a, 104b. The Kalina Cycle 400 also can include two other heat exchangers, such as heat exchangers 910, 920, as well as a separator 930. The Kalina Cycle 400 also can work with one or more external heat sources 122 as well as a heat exchanger or evaporator 110, a turbine 112, and a generator 126.

Similar to the Kalina Cycles 100, 200, and 300, the Kalina Cycle 400 can include a drain tank 116 (containing the lean fluid) and a tank 120 (containing the basic working fluid). Furthermore, similar to the Kalina Cycle 300, the Kalina Cycle 400 can include a rich fluid external storage tank 702 and/or a lean fluid external storage tank 704. Additionally, the Kalina Cycle 400 can include pumps 106, 118, 710, and 716, which can pump fluid within the Kalina Cycle 400 as well as into and out of the Kalina Cycle 400, as further described below.

Hence, starting at the outlet of the tank 120, the basic working fluid (at point 41) is pumped to a higher pressure by the feed pump 106 to create a pressurized working fluid at point 42. The pressurized working fluid then passes through the heat exchanger 920, where it is preheated to create a preheated working fluid at point 43. The preheated working fluid then passes through heat exchanger 110, where it is heated by the external heat source 122 to create an at least partially evaporated working stream at point 44. The at least partially evaporated working stream then passes through the turbine 112, and drives the turbine 112 to generate mechanical energy that is converted into electrical energy by the generator 126. Within the turbine 112, the working stream expands, and exits the turbine 112 as a low-pressure working stream or an at least partially spent stream (i.e., a mixed stream of liquid and vapor) at point 45.

The low-pressure working stream then passes through the secondary side of the heat exchanger 910 to preheat the lean stream pumped from the drain tank 116 through the primary side of the heat exchanger 910, as further described below. By preheating the lean stream, the low-pressure working stream is cooled to a mixed phase at point 46. Subsequently, at point 47, the low-pressure working stream is mixed with a cooled lean liquid stream exiting the secondary side of the heat exchanger 920 (described below), and the combined mixture enters the condenser 104b. The combined mixture is then further cooled within the condenser 104b by the external cooling source 124b, and then exits the condenser 104b at point 48 as a cooled lean liquid stream. Subsequently, the lean stream can enter the drain tank 116.

From the drain tank 116, when the control valve 136 is open, the drain pump 118 can pump the lean stream into the primary side of the heat exchanger 910 as well as into the condenser 104a (as described below). The portion of the lean stream that enters the heat exchanger 910 is then heated and exits the heat exchanger 910, at point 49, as a lean mixed (liquid/vapor phase) fluid. Subsequently, the lean mixed fluid enters the separator 930, which separates the lean mixed fluid into a preheated lean liquid stream at point 50 and rich vapor at point 51, which has an increased concentration as compared with the lean mixed fluid at the point 49.

From the point 50, the preheated lean liquid stream enters the heat exchanger 920 on the secondary side, and preheats the pressurized working fluid, as described above. As the preheated lean stream passes through the heat exchanger 920, the preheated lean stream cools, forming the cooled lean liquid stream at point 52. Thereafter, at the point 47, as described above, the cooled lean stream is mixed with the low-pressure working stream, which exits the heat exchanger 910 at the point 46.

As described above, another portion of the lean stream that is pumped from the drain tank 116 flows toward the condenser 104a. More specifically, at point 53, the rich vapor (from point 51) combines together with the lean liquid stream from the drain tank 116, and the combined working fluid flows into the condenser 104a. The condenser 104a, subsequently, cools the combined working fluid, and the cooled working fluid exits the condenser 104a at point 54. Subsequently, the working fluid can flow into the tank 120 and/or into the rich fluid external storage tank 702. In particular, when the valve 706 is closed to the rich fluid external storage tank 702, the working fluid flows from the point 54 into the tank 120. The process is then repeated in a closed loop arrangement.

Concentration of the working fluid can be adjusted by adjusting the level of the lean stream contained within the drain tank 116. More specifically, to increase the amount of ammonia in the working fluid the level of the lean stream contained within the drain tank 116 can be increased. Conversely, to decrease the amount of ammonia in the working fluid, the level of lean stream contained within the 116 can be decreased. The control system 130, as described above in connection with Kalina Cycles 100, 200, and 300, can automate the process of adjusting the concentration of the working fluid, to optimize the output of the Kalina Cycle 400 at different temperatures of the heat source 122 and/or cooling sources 124a, 124b.

In particular, similar to the Kalina Cycle 100, the control system 130 can monitor the parameters of the working fluid at the various points in the Kalina Cycle 400. Additionally, the control system 130 also can monitor one or more of the heat source 122 temperature and the cooling source 124 temperature. Based on the measured parameters of the working fluid and the temperatures of the heating and cooling sources, the control system can optimize or otherwise modify the concentration of the working fluid to increase the efficiency of the Kalina Cycle 400. In other words, the control system 130 can increase or decrease the amount of ammonia in the basic working fluid mixture to influence the efficiency of the Kalina Cycle 400.

In order to aid in this process, the control system 130 can include sensors 128a, 128b that measures a parameter of the cooling sources 124a, 124b. A transmission mechanism A can transmit data recorded or measured by the sensors 128a, 128b to a control system processor or computer of the control system 130. The transmission mechanism A can send data to the system processor of the control system 130 via a universal serial bus (USB) connection, serial connection, parallel connection, wireless connection, Bluetooth connection, and/or any other communication connection.

In one embodiment, the sensors 128a, 128b can be temperature sensors adapted to measure the temperature of the cooling source 124 and transmit the temperature of the cooling sources 124a, 124b to the control system processor or computer of the control system 130. In another embodiment, sensors 128a, 128b can be adapted to measure other characteristics or parameters of the cooling sources 124a, 124b, such as fluid flow properties (e.g., a flow rate). According to some implementations of the present invention, the control system processor of the control system 130 is located on site with the Kalina Cycle 400. According to alternative implementations of the present invention, the control system processor of the control system 130 is located remotely from the site of the Kalina Cycle 400.

The transmission mechanism B can transmit data recorded or measured by the sensor 132 to a control system processor or computer of the control system 130, as described above. The control system 130 can also include a drain tank level transmitter 134a that measures the level of the lean stream within the drain tank 116 and a lean fluid storage tank level transmitter 134b, which measures the level of the lean fluid in the lean fluid external storage tank 704. Transmission mechanisms can transmit data recorded or measured by the sensor 132 to the control system 130.

Additionally, the drain tank level control valve 136 can allow the control system 130 to control the amount or level of lean stream contained within the drain tank 116. Similarly, the tank level transmitter 139a and the rich fluid storage tank transmitter 139b can allow the control system 130 to monitor the level of working fluid and rich fluid, respectively. Accordingly, the control system 130 can regulate fluid levels within the drain tank 116, tank 120, rich fluid external storage tank 702, and lean fluid external storage tank 704.

Without adding or removing fluid, while the control system 130 adjusts the concentration of the basic mixture, the equilibrium concentration of the Kalina Cycle 400 can remain constant. Moreover, as described above, in some instances, temperature fluctuations may require addition or removal of fluid (lean fluid and rich fluid) in order for the Kalina Cycle 400 to operate at an optimum efficiency. As described above, addition of rich fluid to the Kalina Cycle 400 can increase the overall equilibrium concentration of the Kalina Cycle 400. Conversely, removal of the rich fluid from the Kalina Cycle 400 can decrease the overall equilibrium concentration of the Kalina Cycle 400. Similarly, adding lean fluid to the Kalina Cycle 400 reduces the overall equilibrium concentration of the Kalina Cycle 400, and removing the lean stream from the Kalina Cycle 400 increases the overall equilibrium concentration of the Kalina Cycle 400.

It should be noted, that, similar to the Kalina Cycle 300, increasing the overall equilibrium concentration of the Kalina Cycle 400 increases the range within which the control system 130 can adjust the concentration of the working fluid. In other words, increasing the overall equilibrium concentration of the Kalina Cycle 400 raises the lower and the upper bounds of the possible concentration of the working fluid within the Kalina Cycle 400. Likewise, decreasing the overall equilibrium concentration of the Kalina Cycle 400 lowers the lower and upper bounds of the possible concentration of the working fluid within the Kalina Cycle 400.

Similar to the Kalina Cycle 300, the control system 130 can add rich fluid to the Kalina Cycle 400 from the rich fluid external storage tank 702, in order to increase the equilibrium concentration of the Kalina Cycle 400. Furthermore, the control system 130 can remove working fluid from the Kalina Cycle 400 into the rich fluid external storage tank 702, thereby reducing the overall equilibrium concentration of the Kalina Cycle 400, by allowing the working fluid to flow through the control valve 706 into the rich fluid external storage tank 702. Thus, by monitoring the fluid level in the rich fluid external storage tank 702, the control system 130 can use the tank level transmitter 139b (in conjunction with the transmission mechanism C) to determine the amount of rich fluid added to or removed from the Kalina Cycle 400.

Similarly, the control system 130 can remove lean stream from the Kalina Cycle 400 by opening the control valve 712 and allowing the lean stream exiting the separator 930 to enter into the lean fluid external storage tank 704. Moreover, the control system 130 also can activate the pump 716 and open the lean fluid storage tank level control valve 714 to allow the lean fluid from the lean storage tank 704 to flow into the drain tank 116. In addition to adding and/or removing lean and/or rich fluids, as described above in connection with the Kalina Cycle 300, the control system 130 can adjust the level of the lean stream within the drain tank 116, thereby affecting the concentration of the working fluid.

Although in exemplary embodiments, (e.g., as illustrated in FIGS. 7-9), the rich fluid external storage tank 702 and the lean fluid external storage tank 704, respectively connect at certain points to the Kalina Cycle, it is to be appreciated that the rich fluid external storage tank 702 and the lean fluid external storage tank 704 can connect at any number of other points. For instance, the rich fluid external storage tank 702 can connect directly to the tank 120. Hence, the control system can add fluid to the tank 120 directly from the rich fluid external storage tank 702 (or remove the fluid directly into the rich fluid external storage tank 702), thereby affecting the equilibrium concentration. Similarly, in at least one implementation, the lean fluid external storage tank 704 can connect directly to the drain tank 116 and also can directly exchange fluid with the drain tank 116, thereby affecting the equilibrium concentration.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. An apparatus for implementing a thermodynamic cycle comprising:
   a Kalina Cycle system comprising:
      an expander to expand a multi-component vapor working stream transforming its energy into a useable form and producing a spent stream;
      a separator to separate the spent stream into a rich stream and a lean stream;
      a first tank to receive at least a portion of the lean stream from the separator and hold an amount of the lean stream therein;
      a mixer to mix the lean stream exiting the first tank with the rich stream producing a combined stream;
      a condenser to condense the combined stream producing a multi-component working stream; and
      a second heat exchanger to heat the multi-component working stream producing the multi-component vapor working stream; and
   a first external tank holding rich working fluid or lean working fluid, the first external tank being coupled to the Kalina cycle system to add rich working fluid or lean working fluid to the Kalina Cycle system; and
   a control system to automatically add rich working fluid or lean working fluid from the first external tank to the Kalina Cycle system to change an equilibrium concentration of basic working fluid in the Kalina Cycle system.

2. The apparatus as recited in claim 1, wherein the control system can automatically change the concentration of the multi-component working stream in response to a change in a parameter of the Kalina Cycle system.

3. The apparatus as recited in claim 2, further comprising one or more of a heat source temperature sensor and a cooling source temperature sensor.

4. The apparatus as recited in claim 1, wherein the Kalina Cycle system further comprises a second tank to receive the multi-component working stream from the condenser and hold an amount of the multi-component working stream therein.

5. The apparatus as recited in claim 4, further comprising a second external tank coupled to the Kalina cycle system to add rich working fluid or lean working fluid to the Kalina Cycle system.

6. The apparatus as recited in claim 5, wherein the first external tank holds lean working fluid and the second external tank holds rich working fluid.

7. The apparatus as recited in claim 6, further comprising a first external tank level control valve to control the amount of lean working fluid within the first external tank.

8. The apparatus as recited in claim 7, further comprising a second external tank level control valve to control the amount of rich working fluid within the second external tank.

* * * * *